(12) United States Patent
Levola et al.

(10) Patent No.: US 11,624,869 B2
(45) Date of Patent: Apr. 11, 2023

(54) OPTICAL EXPANDER DEVICE FOR PROVIDING AN EXTENDED FIELD OF VIEW

(71) Applicant: Shenzhen Optiark Semiconductor Technologies Limited, Guangdong (CN)

(72) Inventors: Tapani Kalervo Levola, Guangdong (CN); Houqiang Jiang, Guangdong (CN); Yisheng Zhu, Guangdong (CN)

(73) Assignee: Shenzhen Optiark Semiconductor Technologies Limited, Shenzhen (CN)

( * ) Notice: Subject to any disclaimer, the term of this patent is extended or adjusted under 35 U.S.C. 154(b) by 181 days.

(21) Appl. No.: 17/164,840

(22) Filed: Feb. 2, 2021

(65) Prior Publication Data
US 2022/0214494 A1    Jul. 7, 2022

(30) Foreign Application Priority Data
Jan. 5, 2021    (CN) .......................... 202110006780.0

(51) Int. Cl.
*F21V 8/00*    (2006.01)
*G02B 5/18*    (2006.01)
*G02B 27/00*    (2006.01)
*G02B 27/01*    (2006.01)

(52) U.S. Cl.
CPC ......... *G02B 6/0075* (2013.01); *G02B 5/1814* (2013.01); *G02B 6/0016* (2013.01); *G02B 6/0035* (2013.01); *G02B 27/0081* (2013.01); *G02B 27/0172* (2013.01)

(58) Field of Classification Search
CPC .. G02B 6/0075; G02B 5/1814; G02B 6/0016; G02B 6/0035; G02B 27/0081; G02B 27/0172; G02B 2027/0112; G02B 2027/0174; G02B 2027/0178; G02B 27/0101; G02B 2027/0123
See application file for complete search history.

(56) References Cited

U.S. PATENT DOCUMENTS

| | | | |
|---|---|---|---|
| 2013/0314789 A1* | 11/2013 | Saarikko | G02B 27/42 359/558 |
| 2016/0116739 A1* | 4/2016 | TeKolste | G02B 6/005 385/36 |
| 2020/0348514 A1 | 11/2020 | Chi et al. | |

FOREIGN PATENT DOCUMENTS

| | | |
|---|---|---|
| CN | 101512413 A | 8/2009 |
| CN | 106575034 A | 4/2017 |
| CN | 107966819 A | 4/2018 |

(Continued)

*Primary Examiner* — Kimberly N. Kakalec

(57) ABSTRACT

An optical device comprises a waveguide plate, which in turn comprises: an in-coupling element to form first guided light and second guided light by diffracting input light, first expander element to form third guided light by diffracting the first guided light, second expander element to form fourth guided light by diffracting the second guided light, and an out-coupling element to form first output light by diffracting the third guided light, and to form second output light by diffracting the fourth guided light, wherein the out-coupling element is arranged to form combined output light by combining the first output light with the second output light, wherein the in-coupling element has a first grating period for forming the first guided light, and wherein the in-coupling element has a second different grating period for forming the second guided light.

11 Claims, 18 Drawing Sheets

(56) References Cited

FOREIGN PATENT DOCUMENTS

| | | | |
|---|---|---|---|
| CN | 110543022 | A | 12/2019 |
| CN | 110764261 | A | 2/2020 |
| CN | 110809730 | A | 2/2020 |
| CN | 111123524 | A | 5/2020 |
| CN | 111766704 | A | 10/2020 |
| CN | 111880304 | A | 11/2020 |
| WO | 2017062139 | A1 | 4/2017 |

* cited by examiner ps://www.w3.org/1999/xlink"

OPTICAL EXPANDER DEVICE FOR PROVIDING AN EXTENDED FIELD OF VIEW

CROSS REFERENCE TO RELATED APPLICATIONS

The present application claims the benefit of Chinese Patent Application No. 202110006780.0 filed on Jan. 5, 2021. All the above are hereby incorporated by reference. the contents of which are incorporated herein by reference in their entirety.

TECHNICAL FIELD

The present invention relates to an optical diffractive beam expander for use, e.g., in a virtual display device.

BACKGROUND TECHNOLOGY

Referring to FIG. 1, an expander device EPE0 comprises a waveguide plate SUB01, which in turn comprises a diffractive in-coupling element DOE01, a diffractive expander element DOE02, and a diffractive out-coupling element DOE03. The expander device EPE0 forms an output light beam OUT1 by diffractively expanding light of an input light beam IN1.

The input light beam IN1 may be generated by an optical engine ENG1. The optical engine ENG1 may comprise e.g. a micro display DISP1 and collimating optics LNS1.

The in-coupling element DOE01 forms first guided light B1 by diffracting input light B1. The expander element DOE02 forms expanded guided light B3 by diffracting the first guided light B1. The out-coupling element DOE03 forms output light OUT1 by diffracting the expanded guided light B3.

The expander device EPE0 may expand a light beam in two transverse directions, in the direction SX and in the direction SY. The width wOUT1 of the output light beam OUT1 is greater than the width wIN1 of the input light beam IN1. The expander device EPE0 may be arranged to expand a viewing pupil of a virtual display device, so as to facilitate positioning of an eye EYE1 with respect to the virtual display device. A human observer may see a displayed virtual image in a situation where the output light is arranged to impinge on an eye EYE1 of the human viewer. The output light may comprise one or more output light beams, wherein each output beam OUT1 may correspond to a different image point of a displayed virtual image VIMG1. The expander device may also be called e.g. as an exit pupil extender.

The displayed virtual image VIMG1 may have an angular width LIM1. An attempt to use the expander device EPE0 of FIG. 1 for displaying a multi-color virtual image VIMG1 may cause a situation where red or blue light corresponding to a corner point of the virtual image VIMG1 does not fulfill the criterion of total internal reflection when propagating in the waveguide plate SUB01. Consequently, one or more corner regions of the displayed multi-color virtual image VIMG1 may exhibit a lack of red or blue color.

SUMMARY

An object is to provide an expander device. An object is to provide a method for expanding a light beam. An object is to provide a display device. An object is to provide a method for displaying an image. The expander device may be arranged to provide an extended field of view.

According to an aspect, there is provided an optical device (EPE1) comprising:
a waveguide plate (SUB1) comprising:
an in-coupling element (DOE1) to form first guided light (B1a) and second guided light (B1b) by diffracting input light (IN1),
first expander element (DOE2a) to form third guided light (B2a) by diffracting the first guided light (B1a),
second expander element (DOE2b) to form fourth guided light (B2b) by diffracting the second guided light (B1b), and
an out-coupling element (DOE3) to form first output light (OB3a) by diffracting the third guided light (B2a), and to form second output light (OB3b) by diffracting the fourth guided light (B2b),
wherein the out-coupling element (DOE3) is arranged to form combined output light (OUT1) by combining the first output light (OB3a) with the second output light (OB3b), wherein the in-coupling element (DOE1) has a first grating period ($d_{1a}$) for forming the first guided light (B1a), and wherein the in-coupling element (DOE1) has a second different grating period ($d_{1b}$) for forming the second guided light (B1b).

Other embodiments are defined in the claims.

The scope of protection sought for various embodiments of the invention is set out by the independent claims. The embodiments, if any, described in this specification that do not fall under the scope of the independent claims are to be interpreted as examples useful for understanding various embodiments of the invention.

The expander device may be arranged to display a multi-color image, wherein the multi-color image may have an extended width. The multi color image may be e.g. an RGB image, which comprises red (R) light, green (G) light, and blue (B) light.

Increasing the width of the displayed image may cause leakage of blue light and/or red light of the corner points of the displayed image. In other words, the in-coupling element of the expander device may form red light or blue light, which cannot be confined to the waveguiding plate by total internal reflection.

The expander device may be arranged to provide two different routes for light, in order to overcome limitations set by the capability of the waveguiding plate to guide light of different colors in directions, which correspond to a wide image.

The expander device may split input light to propagate to the out-coupling element via a first route and via a second route. The first route may pass from the in-coupling element to the out-coupling element via the first expander element. The second route may pass from the in-coupling element to the out-coupling element via the second expander element. The first route may be optimized e.g. for guiding blue light of a corner point, and a second route may be optimized e.g. for guiding red light of the corner point. Consequently, the expander device may be arranged to display all corner points of an image in red and blue color. Red light of a corner point may be guided via at least one route, and blue light of the corner point may be guided via at least one route.

As a consequence of the optimization and the extended angular width of the displayed image, the first route may exhibit loss of red light of a corner point of the displayed image. The second route may exhibit loss of blue light of a corner point, respectively. However, red light propagating along the second route may at least partly compensate loss of red light from the first route. Blue light propagating along the first route may at least partly compensate loss of blue light from the second route.

The in-coupling element may comprise first diffractive features to diffract light to the first expander element. The in-coupling element may comprise second diffractive features to diffract light to the second expander element. The first diffractive features may have a first grating period and the second diffractive features may have a second different grating period. The first grating period may be selected to ensure that blue guided light of a corner point is confined to the waveguiding plate. The second grating period may be selected to ensure that red guided light of the corner point is confined to the waveguiding plate. The first diffractive features may have a first orientation and the second diffractive features may have a second different orientation.

The two routes may together at least partly compensate an error of the color of the corner point of the displayed image. The two routes may reduce or avoid an error of the color of the corner point of a wide displayed multi-color image. The two routes may improve uniformity of color of a wide displayed multi-color image.

The out-coupling element may form first out-coupled light by diffracting the third guided light, which propagates along the first route. The third guided light may be received from the first expander element. The out-coupling element may form second out-coupled light by diffracting the fourth guided light, which propagates along the second route. The fourth guided light may be received from the second expander element. The first output light may spatially overlap the second output light. The out-coupling element may form combined output light by combining the first output light with the second output light.

The out-coupling element may comprise first diffractive features to diffract guided light received from the first expander element. The out-coupling element may comprise second diffractive features to diffract guided light received from the second expander element. The first diffractive features may have a first grating period and the second diffractive features may have a second different grating period. The first grating period may be selected to ensure that blue guided light of a corner point is confined to the waveguiding plate. The second grating period may be selected to ensure that red guided light of the corner point is confined to the waveguiding plate. The first diffractive features may have a first orientation and the second diffractive features may have a second different orientation. The first diffractive features may have low or negligible efficiency for coupling light received from the second expander element out of the waveguiding plate. The second diffractive features may have low or negligible efficiency for coupling light received from the first expander element out of the waveguiding plate.

BRIEF DESCRIPTION OF THE DRAWINGS

In the following examples, several variations will be described in more detail with reference to the appended drawings, in which.

DESCRIPTION OF THE EMBODIMENTS

Figure 1:
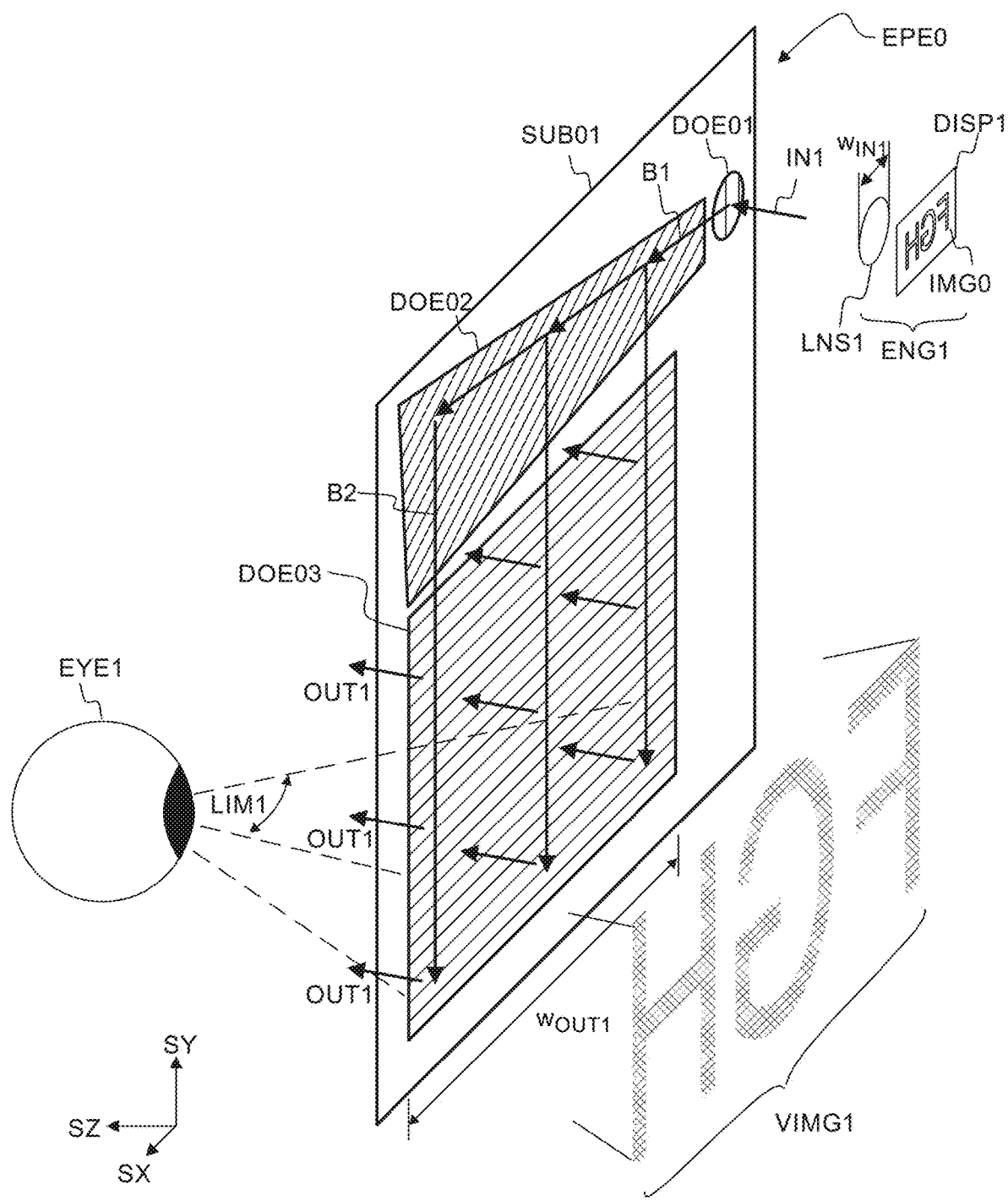
FIG. 1 shows, as a comparative example, an expander device.

Referring to FIGS. 2a to 2e, an optical engine ENG1 may comprise a display DISP1 and collimating optics LNS1. The display DISP1 may be arranged to display an input image IMG0. The display DISP1 may also be called e.g. as a micro display. The display DISP1 may also be called e.g. as a spatial intensity modulator. The input image IMG0 may also be called e.g. as primary image.

The input image IMG0 may comprise a center point P0 and four corner points P1, P2, P3, P4. P1 may denote an upper left corner point. P2 may denote an upper right corner point. P3 may denote a lower left corner point. P4 may denote a lower right corner point. The input image IMG0 may comprise e.g. the graphical characters "F", "G", and "H".

The input image IMG0 may be a multi-color image. The input image IMG0 may be e.g. an RGB image, which may comprise a red partial image, a green partial image, and a blue partial image. Each image point may provide e.g. red light, green light and/or blue light. The light of a red light beam may have red color, e.g. at a wavelength 650 nm. The light of a green light beam may have a green color, e.g. at a wavelength 510 nm. The light of a blue light beam may have a blue color, e.g. at a wavelength 470 nm. In particular, light of a corner point of the multi-color image IMG0 may comprise red light and blue light.

The optical engine ENG1 may provide input light IN1, which may comprise a plurality of substantially collimated light beams (B0). Each red light beam may propagate in a different direction and may correspond to a different point of the input image IMG0. For example, a red light beam $B0_{P1,B}$ may correspond to an image point P1, and may propagate in the direction of a wave vector $k0_{P1,R}$.

Also a blue light beam $(B0_{P1,B})$ may correspond to the same image point P1, and may propagate in the direction of a wave vector $(k0_{P1,B})$.

The input light IN1 may be formed such that the direction $(k0_{P1,B})$ of propagation of the blue light beam $(B0_{P1,B})$ corresponding to a first corner point P1 of the input image IMG0 may be parallel with the direction $k0_{P1,R}$ of propagation of the red light beam $B0_{P1,R}$.

The input light IN1 may be formed such that the direction $(k0_{P2,B})$ of propagation of a blue light beam $(B0_{P1,B})$ corresponding to a second corner point P2 of the input image IMG0 may be parallel with the direction $(k0_{P2,R})$ of propagation of a red light beam $(B0_{P2,R})$, which corresponds to said second corner point P2.

A red light beam $B0_{P2,R}$ may correspond to an image point P2, and may propagate in the direction of a wave vector $k0_{P2,R}$. A red light beam $B0_{P3,R}$ may correspond to an image point P3, and may propagate in the direction of a wave vector $k0_{P3,R}$. A red light beam $B0_{P4,R}$ may correspond to an image point P4, and may propagate in the direction of a wave vector $k0_{P4,R}$. A red light beam $B0_{P0,R}$ may correspond to a central image point P1, and may propagate in the direction of a wave vector $k0_{P0,R}$.

The wave vector (k) of light may be defined as the vector having a direction of propagation of said light, and a magnitude given by $2\pi/\lambda$, where $\lambda$ is the wavelength of said light.

Figure 2A:
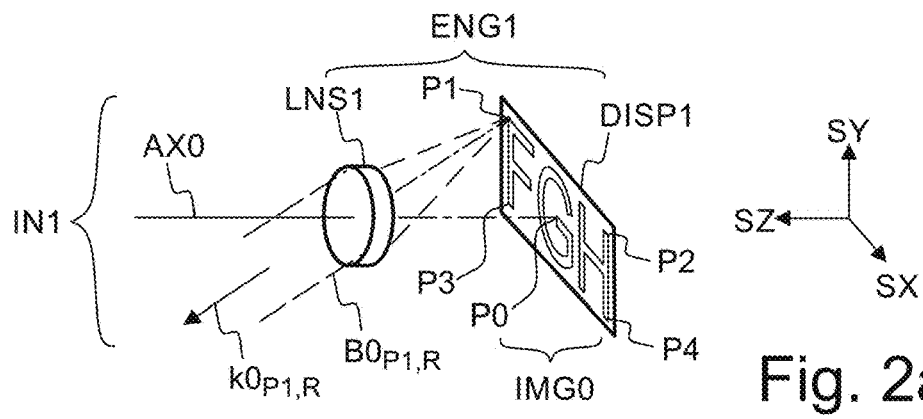
FIGS. 2a to 2e show, by way of example, in a three-dimensional view, forming input light beams by using an optical engine.
Figure 2B:
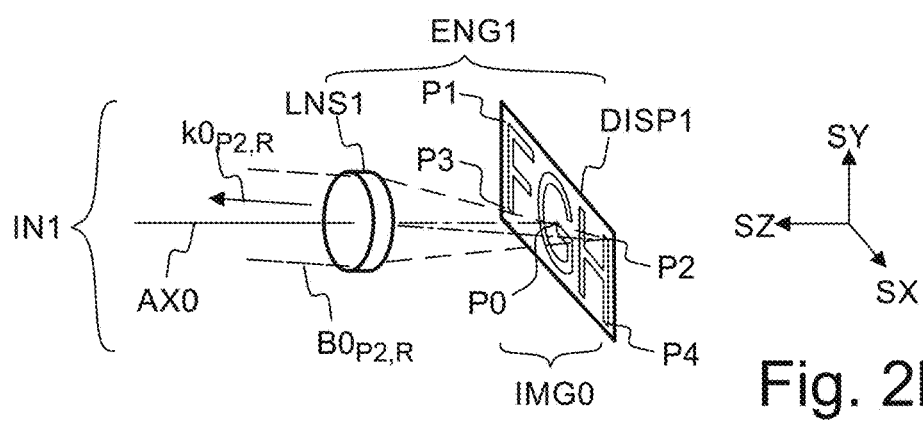
Figure 2C:
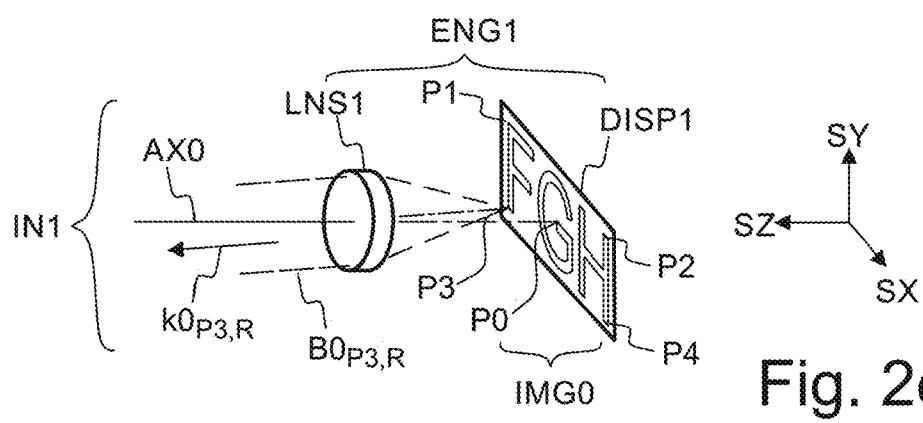
Figure 2D:
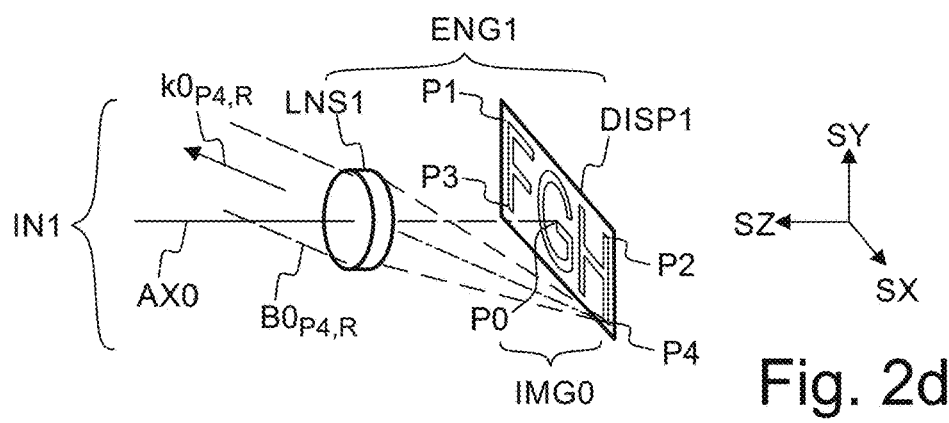
Figure 2E:
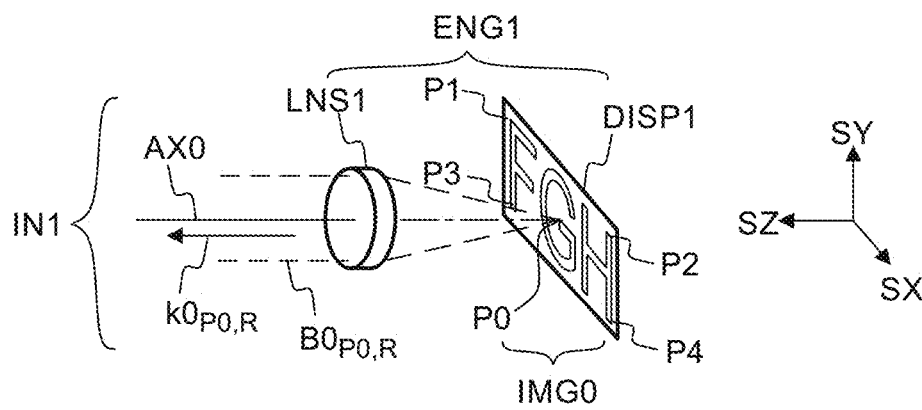
Figure 2F:
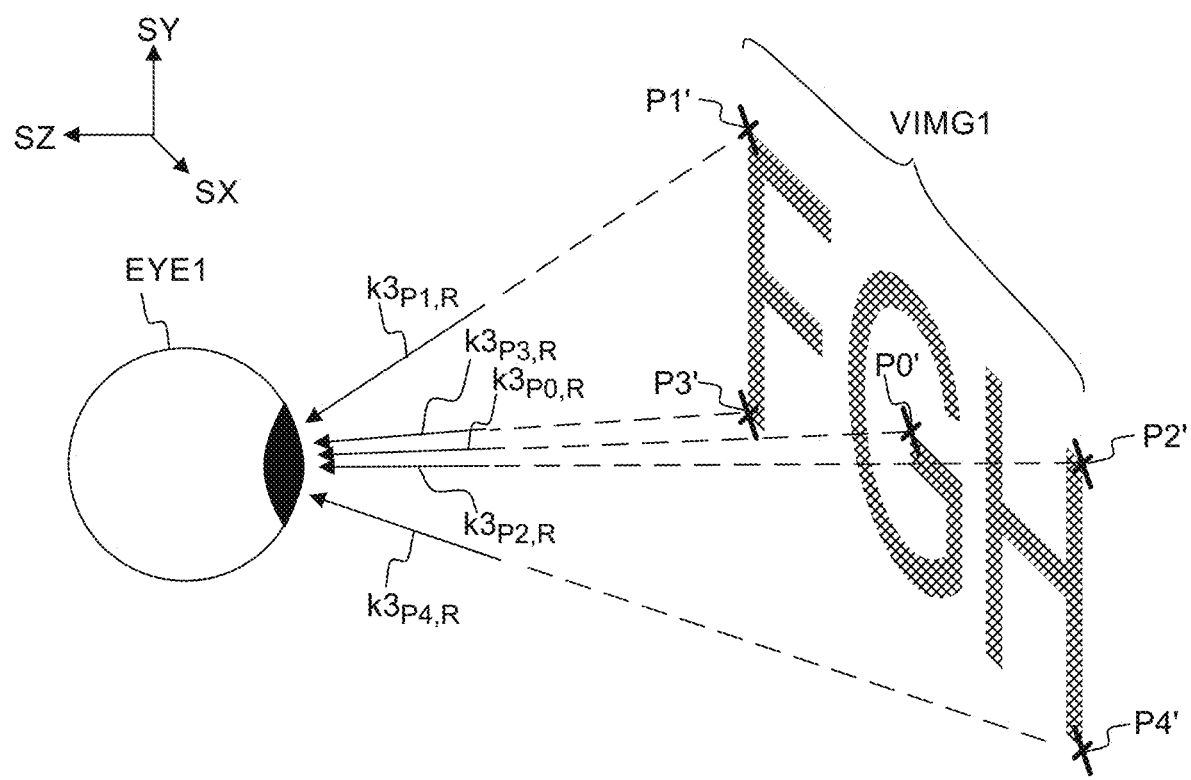
FIG. 2f shows, by way of example, in a three-dimensional view, viewing a displayed virtual image.

Referring to FIG. 2f, output light OUT1 may comprise a plurality of output light beams, which may correspond to a displayed virtual image VIMG1. Each output beam may correspond to a point of the image. For example a red light beam propagating in a direction of a wave vector $k3_{P0,R}$ may correspond to a point P0' of the image VIMG1. A red light beam propagating in a direction of a wave vector $k3_{P1,R}$ may correspond to a point P1' of the image VIMG1. A red light beam propagating in a direction of a wave vector $k3_{P2,R}$ may correspond to a point P2' of the image VIMG1. A red light beam propagating in a direction of a wave vector $k3_{P3,R}$ may correspond to a point P3'. A red light beam propagating in a direction of a wave vector $k3_{P4,R}$ may correspond to a point P4'.

The expander device EPE1 may form the output light OUT1 by expanding the exit pupil of the optical engine ENG1. The output light OUT1 may comprise a plurality of output light beams, which correspond to the displayed virtual image VIMG1. The output light OUT1 may impinge on the eye EYE1 of an observer such that the observer may see the displayed virtual image VIMG1.

The displayed virtual image VIMG1 may have a center point P0' and four corner points P1', P2', P3', P4'. The input light IN1 may comprise a plurality of partial light beams corresponding to the points P0, P1, P2, P3, P4 of the input image IMG0. The expander device EPE1 may form the point P0' of the displayed virtual image VIMG1 by diffracting and guiding light of the point P0 of the input image IMG0. The expander device EPE1 may form the points P1', P2', P3', P4' by diffracting and guiding light of the points P1, P2, P3, P4, respectively.

The expander device EPE1 may form output light OUT1, which comprises a plurality of light beams propagating in different directions specified by the wave vectors $k3_{P0,R}$, $k3_{P1,R}$, $k3_{P2,R}$, $k3_{P3,R}$, $k3_{P4,R}$.

A red light beam corresponding to the point P0' of the displayed virtual image VIMG1 has a wave vector $k3_{P0,R}$. A red light beam corresponding to the point P1' has a wave vector $k3_{P1,R}$. A red light beam corresponding to the point P2' has a wave vector $k3_{P2,R}$. A red light beam corresponding to the point P3' has a wave vector $k3_{P3,R}$. A red light beam corresponding to the point P4' has a wave vector $k3_{P4,R}$.

The expander device EPE1 may be arranged to operate such that the wave vector $k3_{P1,R}$ is parallel with the wave vector $k0_{P1,R}$ of red light of the point P1 in the input light IN1. The wave vector $k3_{P0,R}$ may be parallel with the wave vector $k0_{P0,R}$ of the point P0. The wave vector $k3_{P2,R}$ may be parallel with the wave vector $k0_{P2,R}$ of the point P2. The wave vector $k3_{P3,R}$ may be parallel with the wave vector $k0_{P3,R}$ of the point P3. The wave vector $k3_{P4,R}$ may be parallel with the wave vector $k0_{P4,R}$ of the point P4.

Figure 2G:
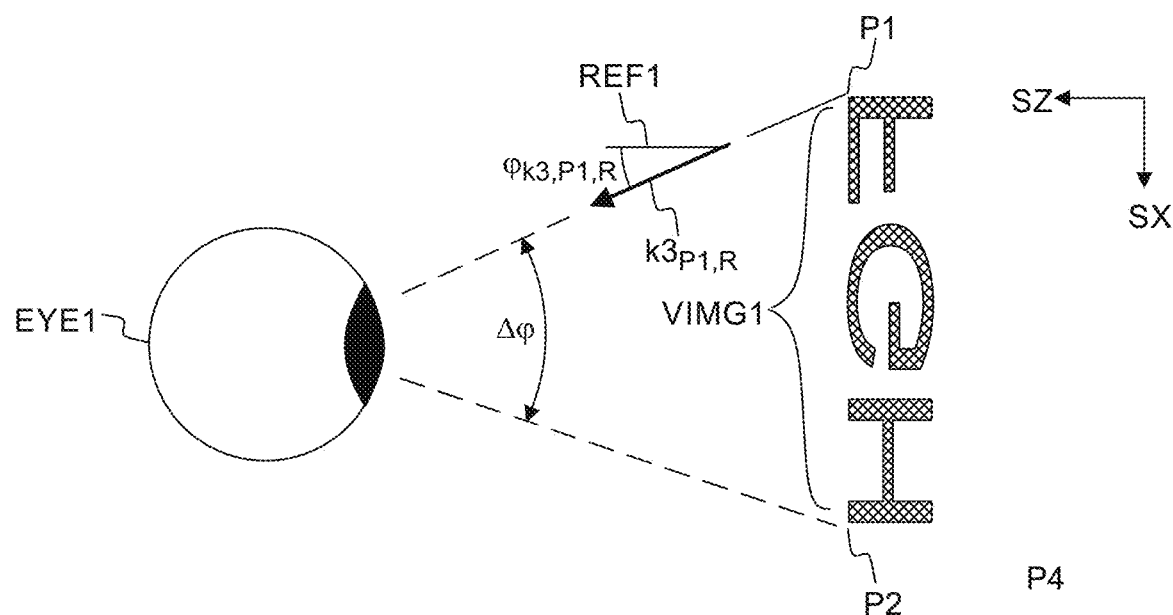
FIG. 2g shows, by way of example, angular width of the displayed virtual image.
Figure 2H:
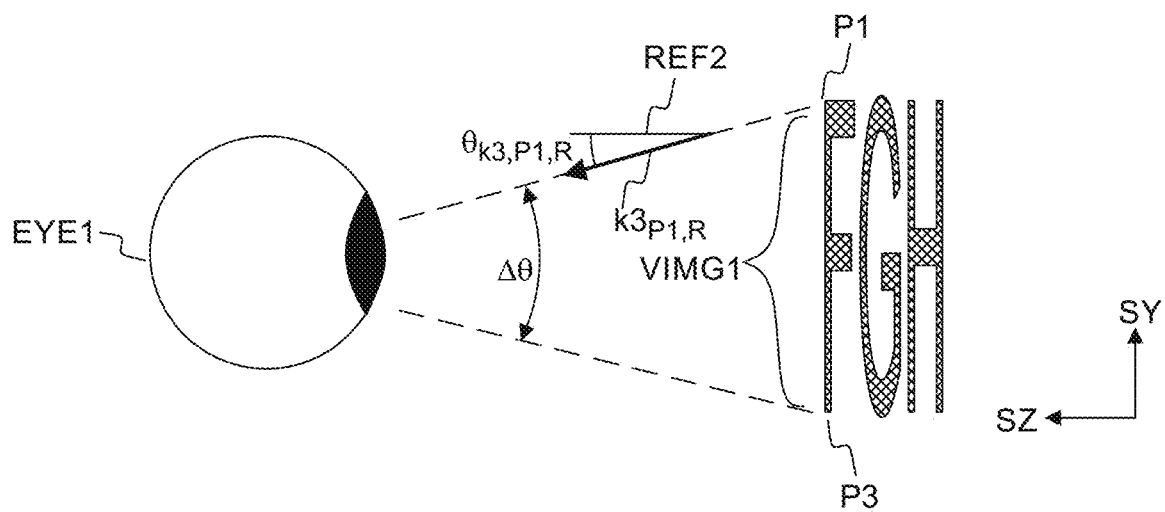
FIG. 2h shows, by way of example, angular height of the displayed virtual image.

Referring to FIGS. 2g and 2h, the displayed virtual image VIMG1 has an angular width $\Delta\varphi$ and an angular height $\Delta\theta$.

The displayed virtual image VIMG1 may have a first corner point P1' e.g. at the left-hand side of the image VIMG1, and a second corner point P2' e.g. at the right-hand side of the image VIMG1. The angular width $\Delta\varphi$ of the virtual image VIMG1 may be equal to the horizontal angle between the wave vectors $k3_{P1,R}$, $k3_{P2,R}$ of the corner points P1', P2'.

The displayed virtual image VIMG1 may have an upper corner point P1' and a lower corner point P3'. The angular height Δθ of the virtual image VIMG1 may be equal to the vertical angle between the wave vectors $k3_{P1,R}$, $k3_{P3,R}$ of the corner points P1', P3'.

The two routes of the expander device EPE1 may allow displaying a wide multi-color virtual image VIMG1. The two routes of the expander device EPE1 may allow displaying a multi-color virtual image VIMG1, which has an extended width Δφ.

The direction of a wave vector may be specified e.g. by orientation angles φ and θ. The angle φ may denote an angle between the wave vector and a reference plane REF1. The reference plane REF1 may be defined e.g. by the directions SZ and SY. The angle θ may denote an angle between the wave vector and a reference plane REF2. The reference plane REF2 may be defined e.g. by the directions SZ and SX.

Figure 3A:
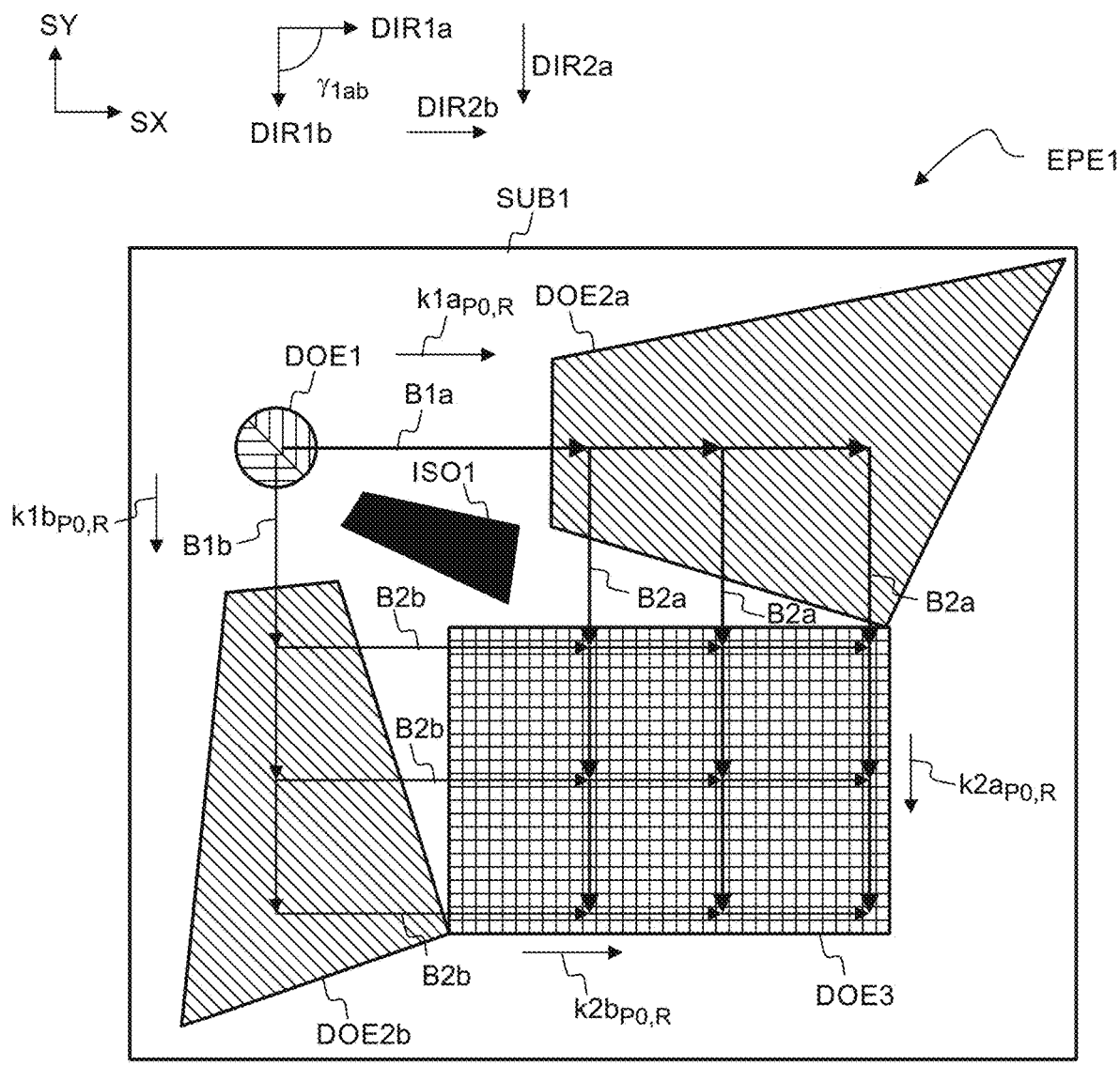
FIG. 3a shows, by way of example, in a front view, an expander device, which provides two different routes for in-coupled light.

Referring to FIG. 3a, the expander device EPE1 may comprise a substantially planar waveguide plate SUB1, which in turn may comprise a diffractive in-coupling element DOE1, a first diffractive expander element DOE2a, a second diffractive expander element DOE2b, and a diffractive out-coupling element DOE3. The gratings may be e.g. on first and/or second surface of the waveguide plate SUB1.

The in-coupling element DOE1 may receive input light IN1, and the out-coupling element DOE3 may provide output light OUT1. The input light IN1 may comprise a plurality of light beams propagating in different directions. The output light OUT1 may comprise a plurality of expanded light beams formed from the light beams (B0) of the input light IN1.

The width $w_{OUT1}$ of the light beams of the output light OUT1 may be greater than the width $w_{IN1}$ of the light beams of the input light IN1. The expander device EPE1 may expand the input light IN1 in two dimensions (e.g. in the horizontal direction SX and in the vertical direction SY). The expansion process may also be called as exit pupil expansion. The expander device EPE1 may be called as a beam-expander device or as an exit pupil expander.

The in-coupling element DOE1 may form first guided light B1a and second guided light B1b by diffracting input light IN1. The first guided light B1a and the second guided light B1b may be waveguided within the planar waveguide plate SUB1. The first guided light B1a and the second guided light B1b may be confined to the plate SUB1 by total internal reflection.

The term "guided" may mean that the light propagates within the planar waveguide plate SUB1 so that the light is confined to the plate by total internal reflection (TIR). The term "guided" may mean the same as the term "waveguided".

The in-coupling element DOE1 may couple the input light IN1 to propagate to the out-coupling element DOE3 via two different routes, i.e. via the first expander element DOE2a and via the second expander element DOE2b. The in-coupling element DOE1 may be optically coupled to the out-coupling element DOE3 via the first expander element DOE2a. The in-coupling element DOE1 may be optically coupled to the out-coupling element DOE3 also via the second expander element DOE2b. The expander device EPE1 may provide a first route from the element DOE1 via the element DOE2a to the element DOE3. The expander device EPE1 may provide a second route from the element DOE1 via the element DOE2b to the element DOE3. The first route may mean an optical path from the in-coupling element DOE1 to the out-coupling element DOE3 via the first expander element DOE2a. The second route may mean an optical path from the in-coupling element DOE1 to the out-coupling element DOE3 via the second expander element DOE2b.

The first guided light B1a may propagate from the in-coupling element DOE1 to the first expander element DOE2a mainly in a first direction DIR1a. The first expander element DOE2a may form third guided light B2a by diffracting the first guided light B1a. The transverse dimension of the third guided light B2a may be greater than the corresponding transverse dimension of the input light IN1. The third guided light B2a may also be called e.g. as expanded guided light B2a.

The expanded guided light B2a may propagate from the first expander element DOE2a to the out-coupling element DOE3. The expanded guided light B2a may be confined to the plate SUB1 by total internal reflection.

The out-coupling element DOE3 may form first output light OB3a by diffracting the expanded guided light B2a.

The second guided light B1b may propagate from the in-coupling element DOE1 to the second expander element DOE2b mainly in a second direction DIR1b. The second expander element DOE2b may form fourth guided light B2b by diffracting the second guided light B1b. A transverse dimension of the fourth guided light B2a may be greater than the corresponding transverse dimension of the input light IN1. The fourth guided light B2b may also be called e.g. as expanded guided light B2b.

The expanded guided light B2b may propagate from the second expander element DOE2b to the out-coupling element DOE3. The expanded guided light B2b may be confined to the plate SUB1 by total internal reflection. The out-coupling element DOE3 may form second output light OB3b by diffracting the expanded guided light B2b.

The out-coupling element DOE3 may diffract guided light B2a received from the first expander element DOE2a, and the out-coupling element DOE3 may diffract guided light B2b received from the second expander element DOE2b.

The direction DIR1a may mean the average propagation direction of the first guided light B1a. The direction DIR1a may denote the central axis of propagation of the first guided light B1a.

The direction DIR1b may mean the average propagation direction of the second guided light B1b. The direction DIR1b may denote the central axis of propagation of the second guided light B1b.

The angle $\gamma_{1ab}$ between the first direction DIR1a and the second direction DIR1b may be e.g. in the range of 60° to 120°.

The expanded guided light B2a may propagate in a third direction DIR2a, which may be e.g. approximately parallel with the second direction DIR1b. The expanded guided light B2b may propagate in a fourth direction DIR2b, which may be e.g. approximately parallel with the first direction DIR1a.

The plate SUB1 may comprise one or more optically isolating elements ISO1 to prevent direct optical coupling between the first expander element DOE2a and the second expander element DOE2b. An isolating element ISO1 may be formed e.g. by depositing (black) absorbing material on the surface of the plate, by adding (black) absorbing material into a region of the plate, and/or by forming one or more openings into the plate.

SX, SY and SZ denote orthogonal directions. The plate SUB1 may be parallel with a plane defined by the directions SX and SY.

Figure 3B:
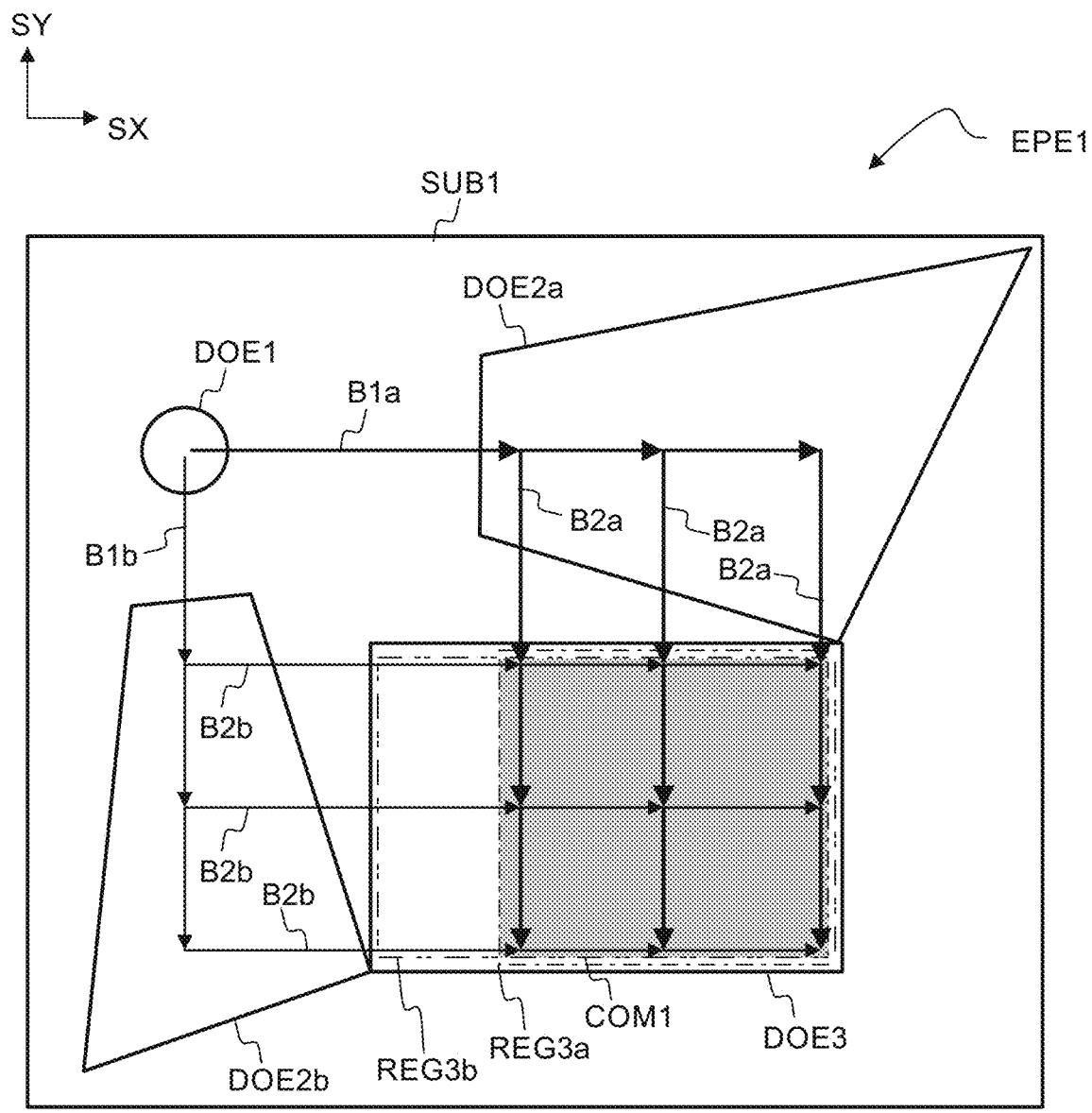
FIG. 3b shows, by way of example, in a front view, out-coupling regions of the out-coupling element.

Referring to FIG. 3b, the first expander element DOE2a may be arranged to distribute the guided light B2a to a first out-coupling region REG3a of the out-coupling element DOE3. The first out-coupling region REG3a may diffract the guided light B2a out of the plate SUB1. The second expander element DOE2b may be arranged to distribute the guided light B2b to a second out-coupling region REG3b of the out-coupling element DOE3. The second out-coupling region REG3b may diffract the guided light B2b out of the plate SUB1.

The first out-coupling region REG3a may overlap with the second out-coupling region REG3b. The common region COM1 of the first out-coupling region REG3a and the second out-coupling region REG3b may diffract guided light B2a and guided light B2b out of the plate SUB1. The area of the common region COM1 may be e.g. greater than 50% of the one-sided area of the out-coupling element DOE3, advantageously greater than 70%.

Figure 4A:
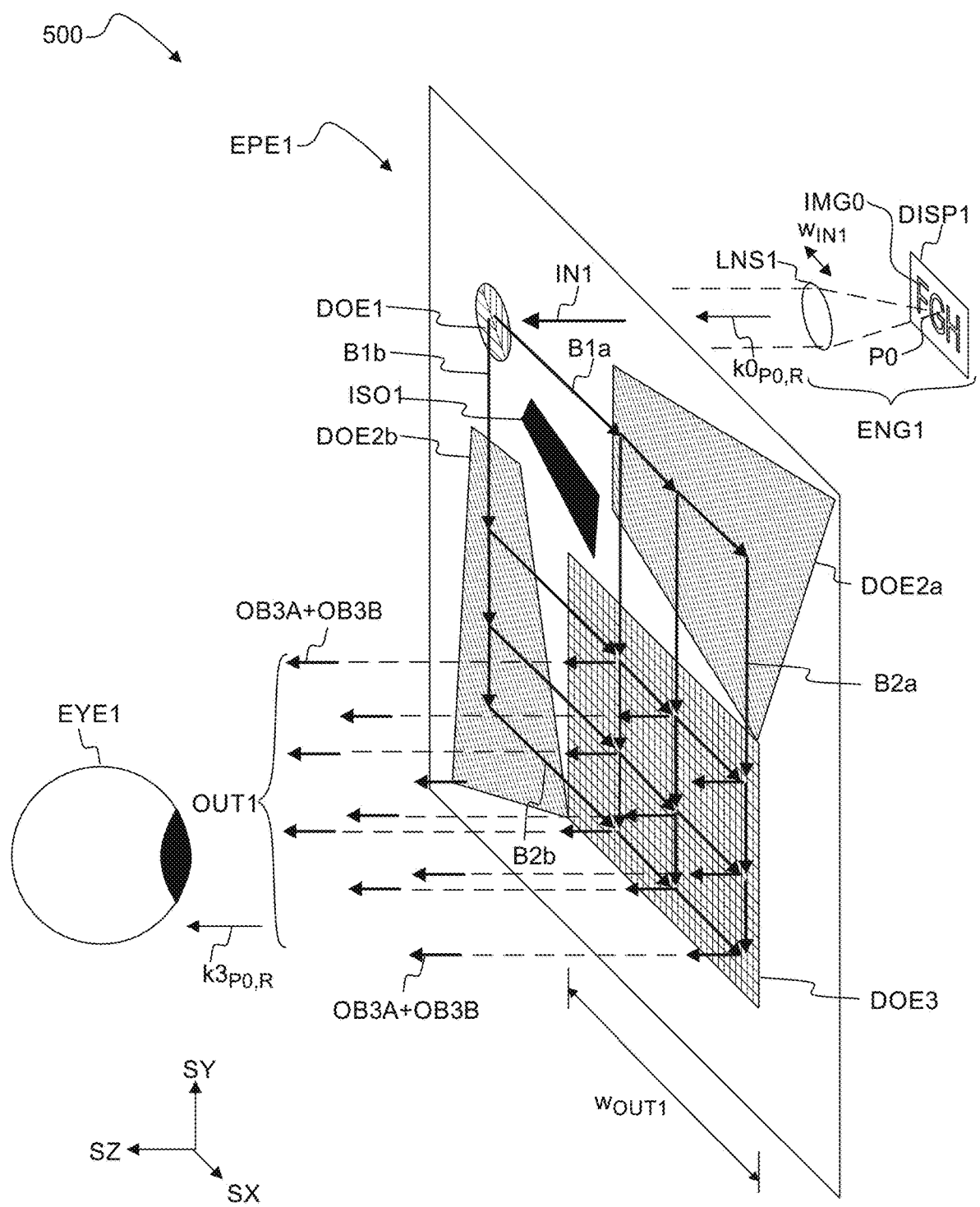
FIG. 4a shows, by way of example, in a three-dimensional view, a display apparatus, which comprises the expander device.
Figure 4B:
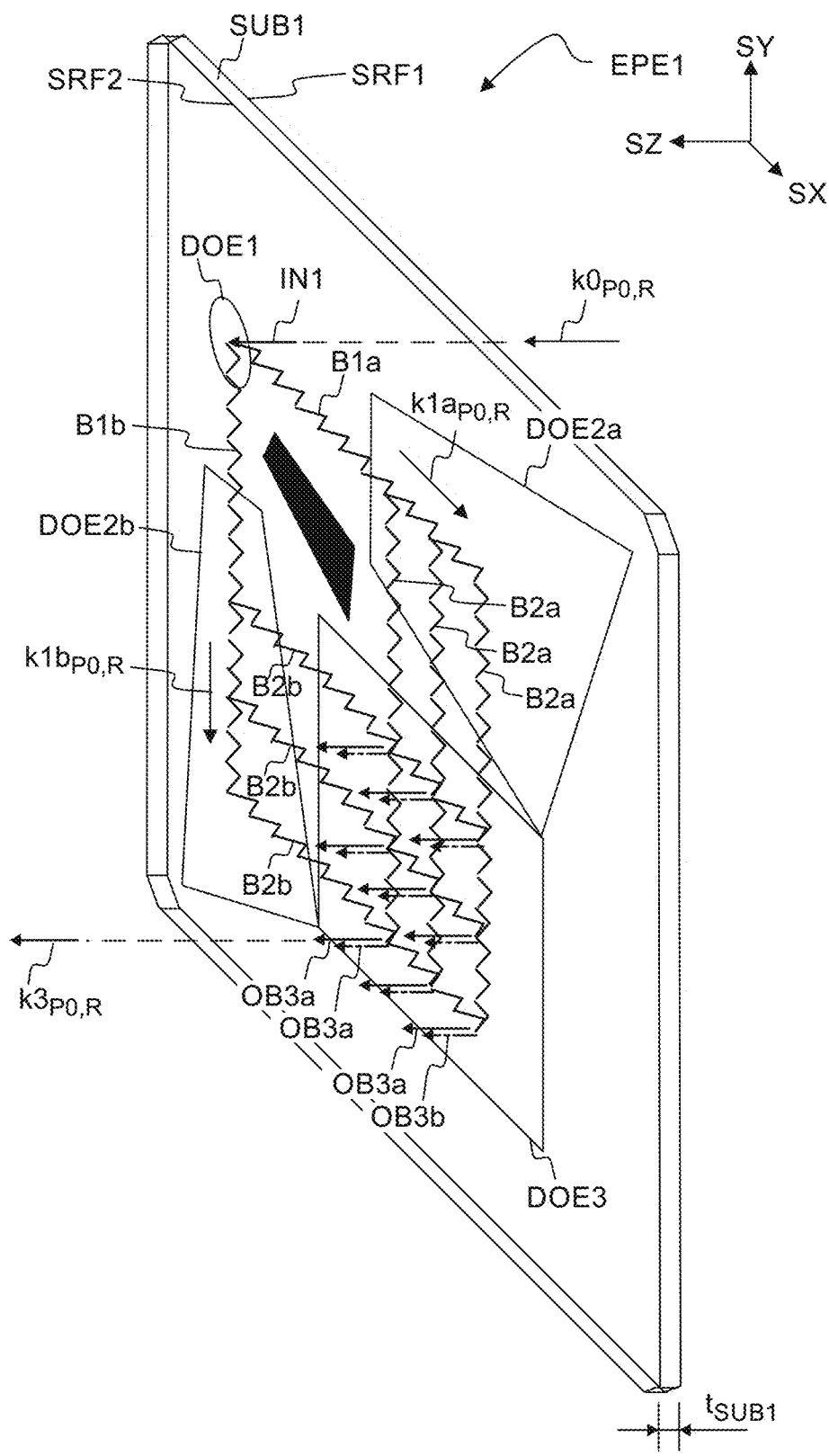
FIG. 4b shows, by way of example, in a three-dimensional view, forming combined output light by combining first out-coupled light with second out-coupled light.
Figure 4C:
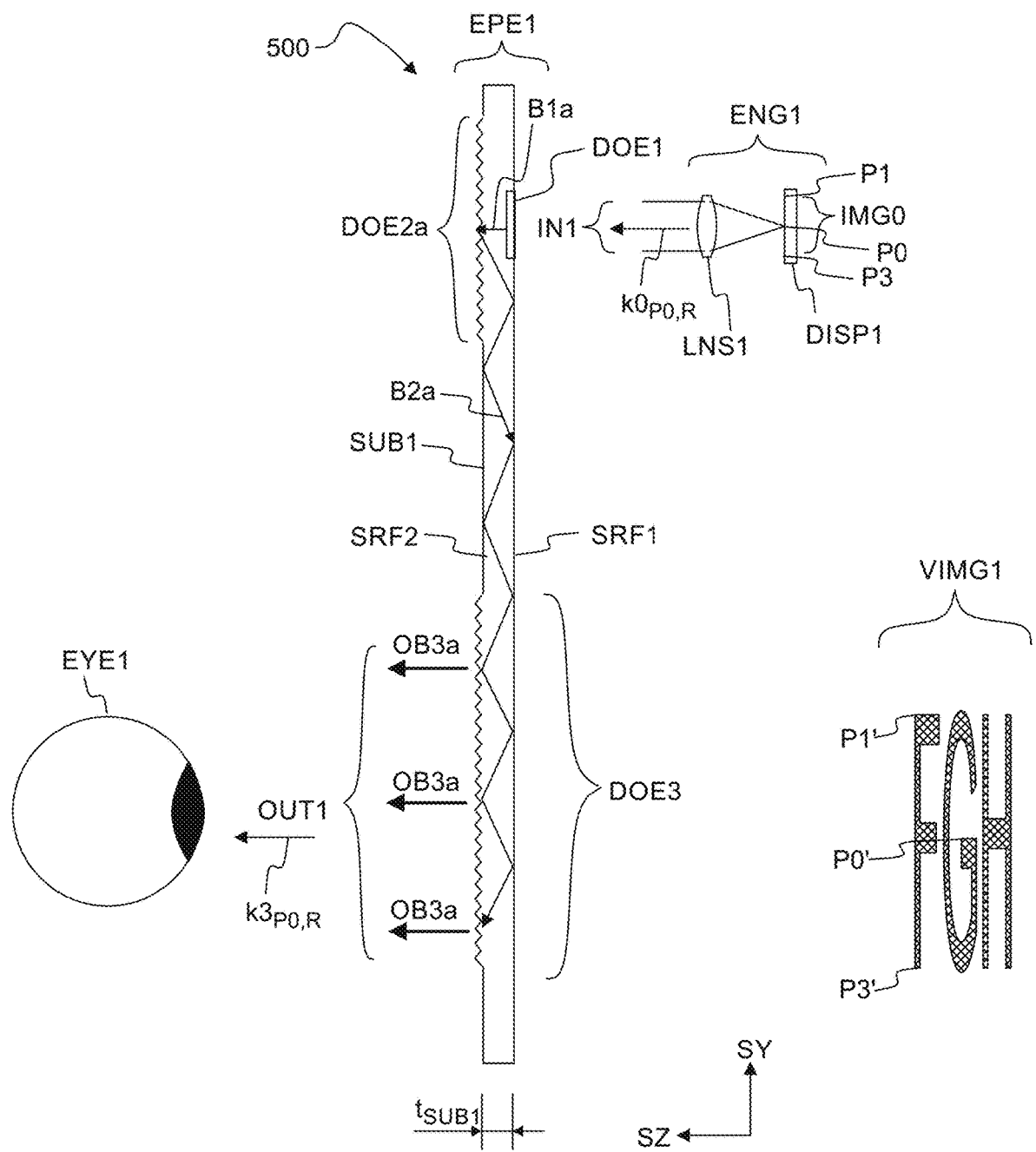
FIG. 4c shows, by way of example, in cross-sectional side view, a display apparatus, which comprises the expander device.

Referring to FIGS. 4a to 4c, the expander device EPE1 may form output light OUT1 by diffracting and guiding input light IN1 obtained from an optical engine ENG1. A display apparatus 500 may comprise the optical engine ENG1 and the expander device EPE1.

The input light IN1 may comprise a plurality of light beams propagating in different directions. Each light beam of the input light IN1 may correspond to a different point of the input image IMG0. The output light OUT1 may comprise a plurality of light beams propagating in different directions. Each light beam of the output light OUT1 may correspond to a different point of the displayed virtual image VIMG1. The expander device EPE1 may form the output light OUT1 from the input light IN1 such that the directions and the intensities of the light beams of the output light OUT1 correspond to the points of the input image IMG0.

A light beam of the input light IN1 may correspond to a single image point (P0) of a displayed image. The expander device EPE1 may form an output light beam from a light beam of the input light IN1 such that the direction ($k_{3,P0,R}$) of the output light beam is parallel with the direction ($k_{0,P0,R}$) of the corresponding light beam of the input light IN1.

The display apparatus 500 may comprise an optical engine ENG1 to form a primary image IMG0 and to convert the primary image IMG0 into a plurality of light beams of the input light IN1. The engine ENG1 may be optically coupled to the in-coupling element DOE1 of the expander EPE1. The input light IN1 may be optically coupled to the in-coupling element DOE1 of the expander device EPE1. The apparatus 500 may be e.g. display device for displaying virtual images. The apparatus 500 may be a near eye optical device.

The expander device EPE1 may carry virtual image content from the light engine ENG1 to the front of a user's eye EYE1. The expander device EPE1 may expand the viewing pupil, thus enlarging the eye box.

The engine ENG1 may comprise a micro-display DISP1 to generate a primary image IMG0. The micro-display DISP1 may comprise a two-dimensional array of light-emitting pixels. The display DISP1 may generate a primary image IMG0 e.g. at a resolution of 1920×1080 (Full HD). The display DISP1 may generate a primary image IMG0 e.g. at a resolution of 1920×1080 (Full HD). The display DISP1 may generate a primary image IMG0 e.g. at a resolution of 3840×2160 (4K UHD). The primary image IMG0 may comprise a plurality of image points P0, P1, P2, . . . . The engine ENG1 may comprise collimating optics LNS1 to form a different light beam from each image pixel. The engine ENG1 may comprise collimating optics LNS1 to form a substantially collimated light beam from light of an image point P0. The light beam corresponding to the image point P0 may propagate in the direction specified by a wave vector $k0_{P0,R}$. A light beam corresponding to a different image point P1 may propagate in a direction $k0_{P1,R}$ which is different from the direction $k0_{P0,R}$.

The engine ENG1 may provide a plurality of light beams corresponding to the generated primary image IMG0. The one or more light beams provided by the engine ENG1 may be coupled to the expander EPE1 as input light IN1.

The engine ENG1 may comprise e.g. one or more light emitting diodes (LED). The display DISP1 may comprise e.g. one or more micro display imagers, such as liquid crystal on silicon (LCOS), liquid crystal display (LCD), digital micromirror device (DMD).

The out-coupling element DOE3 may form first output light OB3a by diffracting guided light B2a received from the first expander element DOE2a. The out-coupling element DOE3 may form second output light OB3b by diffracting guided light B2b received from the second expander element DOE2b. The out-coupling element DOE3 may form combined output light OUT1 by combining the first output light OB3a with the second output light OB3b.

The expander device EPE1 may be arranged to operate such that the direction of light of a given image point (e.g. P0) in the first output light OB3a is parallel with the direction of light of said given image point (P0) in the second output light OB3b. Consequently, the combining the first output light OB3a with the second output light OB3b may form a combined light beam, which corresponds to said given image point (P0).

Each element DOE1, DOE2a, DOE2b, DOE3 may comprise one or more diffraction gratings to diffract light as described.

The grating periods (d) and the orientations (β) of the diffraction gratings of the optical elements DOE1, DOE2a, DOE2b, DOE3 may be selected such that the direction of each light beam of the output light OUT1 may be parallel with the direction of the corresponding light beam of the input light IN1.

The grating periods (d) and the direction (β) of the grating vectors may fulfill e.g. the condition that the vector sum ($m_{1a}V_{1a}+m_{2a}V_{2a}+m_{3a}V_{3a}$) is zero for predetermined integers $m_{1a}$, $m_{2a}$, $m_{3a}$. $V_{1a}$ denotes a grating vector of the element DOE1. $V_{2a}$ denotes a grating vector of the element DOE2a. $V_{3a}$ denotes a grating vector of the element DOE3. The value of these integers is typically +1 or −1. The value of the integer $m_{1a}$ may be e.g. +1 or −1. The value of the integer $m_{2a}$ may be e.g. +1 or −1. The value of the integer $m_{3a}$ may be e.g. +1 or −1.

The grating periods (d) and the direction (β) of the grating vectors may fulfill e.g. the condition that the vector sum ($m_{1b}V_{1b}+m_{2b}V_{2b}+m_{3b}V_{3b}$) is zero for predetermined integers $m_{1b}$, $m_{2b}$, $m_{3b}$. $V_{1b}$ denotes a grating vector of the element DOE1. $V_{2b}$ denotes a grating vector of the element DOE2b. $V_{3b}$ denotes a grating vector of the element DOE3. The value of these integers is typically +1 or −1. The value of the integer $m_{1b}$ may be e.g. +1 or −1. The value of the integer $m_{2b}$ may be e.g. +1 or −1. The value of the integer $m_{3b}$ may be e.g. +1 or −1.

The waveguiding plate may have a thickness $t_{SUB1}$. The waveguiding plate comprises a planar waveguiding core. In an embodiment, the plate SUB1 may optionally comprise e.g. one or more cladding layers, one or more protective layers, and/or one or more mechanically supporting layers. The thickness $t_{SUB1}$ may refer to the thickness of a planar waveguiding core of the plate SUB1.

The expander device EPE1 may expand a light beam in two transverse directions, in the direction SX and in the direction SY. The width (in direction SX) of the output light beam OUT1 may be greater than the width of the input light beam IN1, and the height (in direction SY) of the output light beam OUT1 may be greater than the height of the input light beam IN1.

The expander device EPE1 may be arranged to expand a viewing pupil of the virtual display device 500, so as to facilitate positioning of an eye EYE1 with respect to the virtual display device 500. A human observer may see a displayed virtual image VIMG1 in a situation where the output light OUT1 is arranged to impinge on an eye EYE1 of the human viewer. The output light OUT1 may comprise one or more output light beams, wherein each output light beam may correspond to a different image point (P0', P1') of a displayed virtual image VIMG1. The engine ENG1 may comprise a micro display DISP1 for displaying a primary image IMG0. The engine ENG1 and the expander device EPE1 may be arranged to display the virtual image VIMG1 by converting the primary image IMG0 into a plurality of input light beams (e.g. $B0_{P0,R}$, $B0_{P1,R}$, $B0_{P2,R}$, $B0_{P3,R}$, $B0_{P4,R}$, ... $B0_{P0,B}$, $B0_{P1,B}$, $B0_{P2,B}$, $B0_{P3,B}$, $B0_{P4,B}$, ... ), and by forming output light beams OUT1 from the input beams by expanding the input beams. For example, the notation $B0_{P2,R}$ may mean an input light beam, which corresponds to an image point P2 and which has red (R) color. For example, the notation $B0_{P2,B}$ may mean an input light beam, which corresponds to the image point P2 and which has blue (B) color. The input light beams may together constitute input light IN1. The input light IN1 may comprise a plurality of input light beams (e.g. $B0_{P0,R}$, $B0_{P1,R}$, $B0_{P2,R}$, $B0_{P3,R}$, $B0_{P4,R}$, ... $B0_{P0,B}$, $B0_{P1,B}$, $B0_{P2,B}$, $B0_{P3,B}$, $B0_{P4,B}$, ... ).

The output light OUT1 may comprise a plurality of output light beams such that each output light beam may form a different image point (P0', P1') of the virtual image VIMG1. The primary image IMG0 may be represent e.g. graphics and/or text. The primary image IMG0 may be represent e.g. video. The engine ENG1 and the expander device EPE1 may be arranged to display the virtual image VIMG1 such that each image point (P0', P1') of the virtual image VIMG1 corresponds to a different image point of the primary image IMG0.

The plate SUB1 may have a first major surface SRF1 and a second major surface SRF2. The surfaces SRF1, SRF2 may be substantially parallel with the plane defined by the directions SX and SY.

Figure 5:
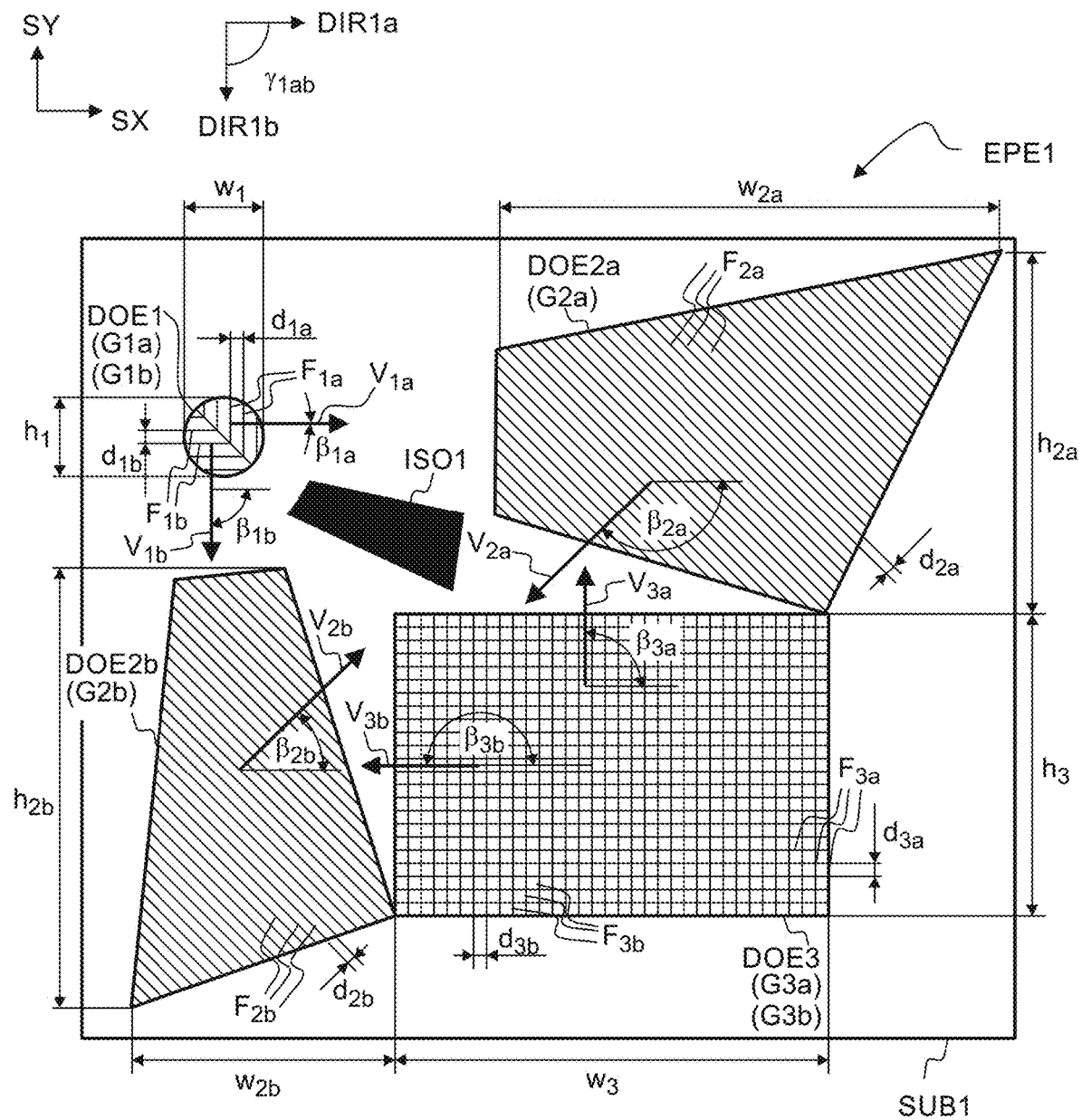
FIG. 5 shows, by way of example, in a front view, dimensions of the expander device.

Referring to FIG. 5, each element DOE1, DOE2a, DOE2b, DOE3 may comprise one or more diffraction gratings to diffract light as described. For example, the element DOE1 may comprise one or more gratings G1a, G1b. For example, the element DOE2a may comprise a grating G2a. For example, the element DOE2b, may comprise a grating G2b. For example, the element DOE3 may comprise one or more gratings G3a, G3b.

A grating period (d) of a diffraction grating and the orientation (β) of the diffractive features of the diffraction grating may be specified by a grating vector V of said diffraction grating. The diffraction grating comprises a plurality of diffractive features (F) which may operate as diffractive lines. The diffractive features may be e.g. microscopic ridges or grooves. The diffractive features may also be e.g. microscopic protrusions (or recesses), wherein adjacent rows of protrusions (or recesses) may operate as diffractive lines. The grating vector V may be defined as a vector having a direction perpendicular to diffractive lines of the diffraction grating and a magnitude given by 2π/d, where d is the grating period.

The in-coupling element DOE1 may have grating vectors $V_{1a}$, $V_{1b}$. The first expander element DOE2a may have a grating vector $V_{2a}$. The second expander element DOE2b may have a grating vector $V_{2b}$. The out-coupling element DOE3 may have grating vectors $V_{3a}$, $V_{3b}$.

The grating vector $V_{1a}$ has a direction $\beta_{1a}$ and a magnitude $2\pi/d_{1a}$. The grating vector $V_{1b}$ has a direction $\beta_{1b}$ and a magnitude $2\pi n/d_{1b}$. The grating vector $V_{2a}$ has a direction $\beta_2$ and a magnitude $2\pi/d_{2a}$. The grating vector $V_{2b}$ has a direction $\beta_{2b}$ and a magnitude $2\pi/d_{2b}$. The grating vector $V_{3a}$ has a direction $\beta_{3a}$ and a magnitude $2\pi/d_{3a}$. The grating vector $V_{3b}$ has a direction $\beta_{3b}$ and a magnitude $2\pi/d_{3b}$. The direction (β) of a grating vector may be specified e.g. by the angle between said vector and a reference direction (e.g. direction SX).

The grating periods (d) and the orientations (β) of the diffraction gratings of the optical elements DOE1, DOE2a, DOE3 may be selected such that the direction $(k3_{P0,R})$ of propagation of light of the center point P0 in the first output light OB3a is parallel with the direction $(k0_{P0,R})$ of propagation of light of the center point P0 in the input light IN1.

The grating periods (d) and the orientations (β) of the diffraction gratings of the optical elements DOE1, DOE2b, DOE3 may be selected such that the direction $(k3_{P0,R})$ of propagation of light of the center point P0 in the second output light OB3b is parallel with the direction $(k0_{P0,R})$ of propagation of light of the center point P0 in the input light IN1.

The grating periods (d) and the orientations (β) of the diffraction gratings of the optical elements DOE1, DOE2a, DOE2b, DOE3 may be selected such that the direction $(k3_{P0,R})$ of propagation of light of the center point P0 in the combined output light OUT1 is parallel with the direction $(k0_{P0,R})$ of propagation of light of the center point P0 in the input light IN1.

An angle between the directions of the grating vectors $V_{1a}$, $V_{1b}$ of the in-coupling element DOE1 may be e.g. in the range of 60° to 120°.

The first grating period $d_{1a}$ of the element DOE1 may be different from the second grating period dib of the element DOE1, for optimizing the first route for a first color, and for optimizing the second route for a second different color.

The first grating period $d_{3a}$ of the element DOE3 may be different from the second grating period $d_{3b}$ of the element DOE3, for optimizing the first route for a first color, and for optimizing the second route for a second different color.

The first grating period $d_{1a}$ of the element DOE1 may be different from the second grating period dib of the element DOE1, e.g. for optimizing the first route for blue color, and for optimizing the second route for red color.

The first grating period $d_{3a}$ of the element DOE3 may be different from the second grating period $d_{3b}$ of the element DOE3, e.g. for optimizing the first route for blue color, and for optimizing the second route for red color.

The grating periods (d) and the direction (β) of the grating vectors may fulfill e.g. the condition that the vector sum $(m_{1a}V_{1a}+m_{2a}V_{2a}+m_{3a}V_{3a})$ is zero for predetermined integers $m_{1a}$, $m_{2a}$, $m_{3a}$. $V_{1a}$ denotes a grating vector of the element DOE1. $V_{2a}$ denotes a grating vector of the element DOE2a. $V_{1a}$ denotes a grating vector of the element DOE3. The value of these integers is typically +1 or −1. The value of the integer $m_{1a}$ may be e.g. +1 or −1. The value of the integer $m_{2a}$ may be e.g. +1 or −1. The value of the integer $m_{3a}$ may be e.g. +1 or −1.

The grating periods (d) and the direction (β) of the grating vectors may fulfill e.g. the condition that the vector sum $(m_{1b}V_{1b}+m_{2b}V_{2b}+m_{3b}V_{3b})$ is zero for predetermined integers $m_{1b}$, $m_{2b}$, $m_{3b}$. $V_{1b}$ denotes a grating vector of the element DOE1. $V_{2b}$ denotes a grating vector of the element DOE2b. $V_{3b}$ denotes a grating vector of the element DOE3. The value of these integers is typically +1 or −1. The value of the integer $m_{1b}$ may be e.g. +1 or −1. The value of the integer $m_{2b}$ may be e.g. +1 or −1. The value of the integer $m_{3b}$ may be e.g. +1 or −1.

The first element DOE1 may have a first grating vector V1a to form the first guided light B1a to the direction DIR1a and a second grating vector V1b to form the second guided light B1b to the direction DIR1b. The first element DOE1 may have first diffractive features F1a to provide a first grating which has a grating period $d_{1a}$ and an orientation $\beta_{1a}$ with respect to a reference direction SX. The first element DOE1 may have second diffractive features F1b to provide a second grating which has a grating period $d_{1b}$ and an orientation $\beta_{1b}$ with respect to the reference direction SX. The first element DOE1 may be implemented e.g. by a crossed grating or by two linear gratings. The first element DOE1 may e.g. comprise a first region, which comprises first features F1a, and the first element DOE1 may comprise a second region, which comprises F1b.

A first linear grating having features F1a may be implemented on a first side (e.g. on an input side SRF1) of the plate SUB1, and a second linear grating having features F1b may be implemented on the second side (e.g. on an output side SRF2) of the plate SUB1. The diffractive features may be e.g. microscopic ridges or microscopic protrusions.

The expander element DOE2a may have a grating vector V2a to form the third guided light B2a by diffracting the first guided light B1a. The expander element DOE2a may have diffractive features F2a to provide a grating G2a which has a grating period $d_{2a}$ and an orientation $\beta_{2a}$ with respect to the reference direction SX.

The expander element DOE2b may have a grating vector V2b to form the fourth guided light B2b by diffracting the second guided light B1b. The expander element DOE2b may have diffractive features F2b to provide a grating G2b which has a grating period deb and an orientation $\beta_{2b}$ with respect to the reference direction SX.

The out-coupling element DOE3 may have a first grating vector V3a to couple the expanded light B2a out of the plate SUB1. The out-coupling element DOE3 may have a second grating vector V3b to couple the expanded light B2b out of the plate SUB1. The out-coupling element DOE3 may have diffractive features F3a to provide a grating G3a which has a grating period $d_{3a}$ and an orientation $\beta_{3a}$ with respect to the reference direction SX. The out-coupling element DOE3 may have diffractive features F3b to provide a grating G3b which has a grating period dab and an orientation $\beta_{3b}$ with respect to the reference direction SX. The out-coupling element DOE3 may be implemented e.g. by a crossed grating or by two linear gratings. A first linear grating G3a having features F3a may be implemented on a first side (e.g. SRF1) of the plate SUB1, and a second linear grating G3b having features F3b may be implemented on the second side (e.g. SRF2) of the plate SUB1.

The in-coupling element DOE1 may have a width $w_1$ and a height $h_1$. The first expander element DOE2a may have a width $w_{2a}$ and a height $h_{2a}$. The second expander element DOE2b may have a width web and a height $h_{2b}$. The out-coupling element DOE3 may have a width $w_3$ and a height $h_3$.

The width may denote a dimension in the direction SX, and the height may denote a dimension in the direction SY. The out-coupling element DOE3 may be e.g. substantially rectangular. The sides of the out-coupling element DOE3 may be aligned e.g. with the directions SX and SY.

The width $w_{2a}$ of the expander element DOE2a may be substantially greater than the width $w_1$ of the in-coupling element DOE1. The width of an expanded guided light beam B2a may be substantially greater than the width w1 of the in-coupling element DOE1.

The plate SUB1 may comprise or consist essentially of transparent solid material. The plate SUB1 may comprise e.g. glass, polycarbonate or polymethyl methacrylate (PMMA). The diffractive optical elements DOE1, DOE2a, DOE2b, DOE3 may be formed e.g. by molding, embossing, and/or etching. The elements DOE1, DOE2a, DOE2b, DOE3 may be implemented e.g. by one or more surface diffraction gratings or by one or more volume diffraction gratings.

The spatial distribution of diffraction efficiency may be optionally tailored e.g. by selecting the local elevation of the microscopic diffractive features F. The elevation of the microscopic diffractive features F of the out-coupling element DOE3 may be optionally selected so as to further homogenize the intensity distribution of the output light OUT1.

Figure 6A:
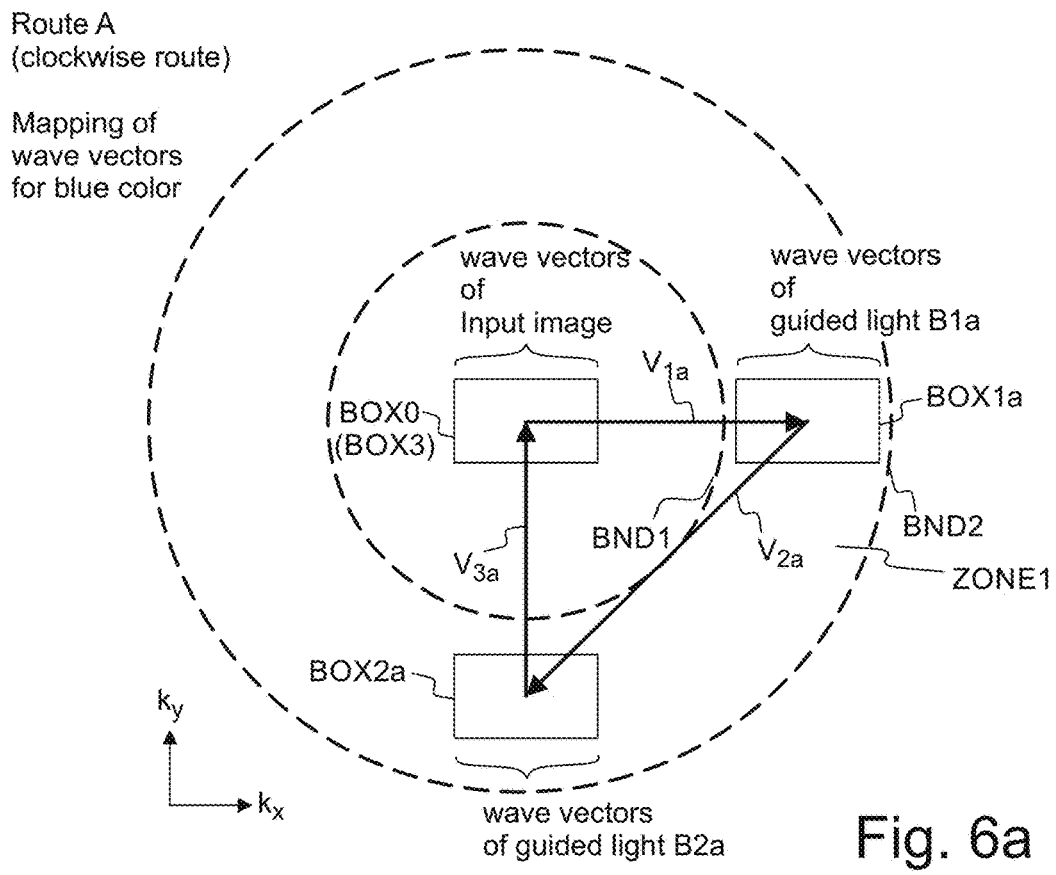
FIG. 6a shows, by way of example, mapping of wave vector values for blue light, which propagates along the first route of the expander device.
Figure 7A:
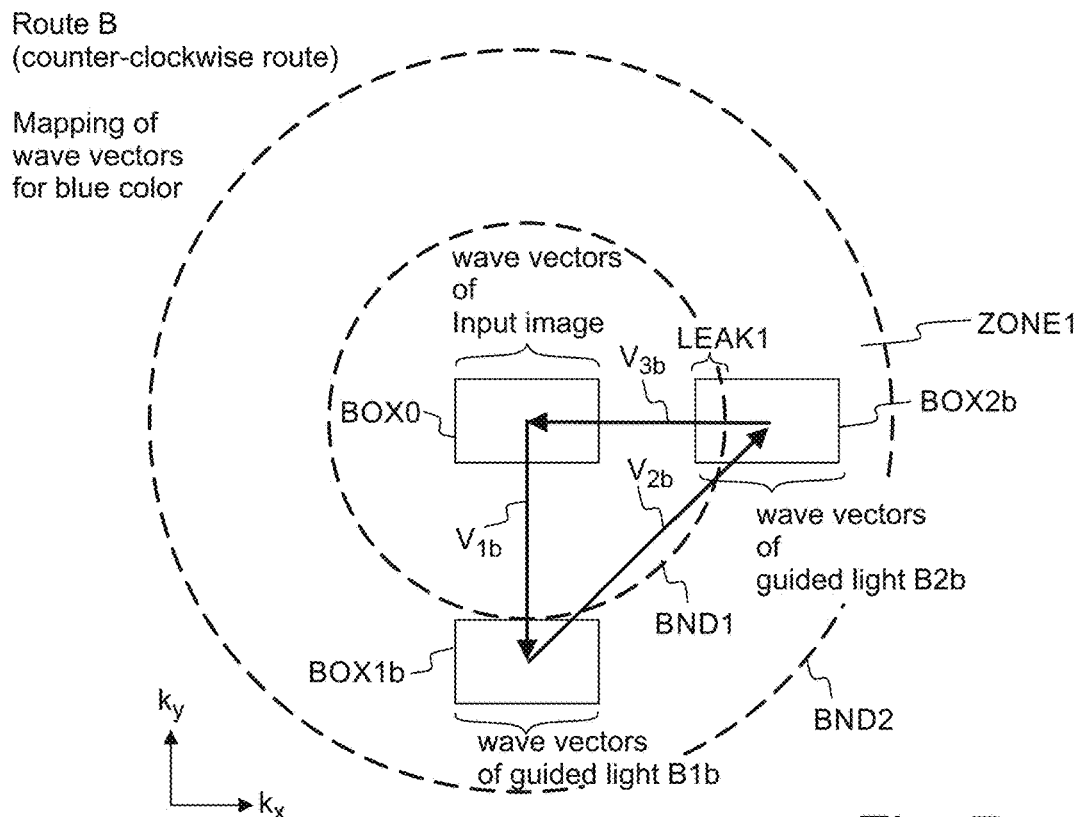
FIG. 7a shows, by way of example, mapping of wave vector values for blue light, which propagates along the second route of the expander device.

FIG. 6a shows, by way of example, mapping of wave vectors for blue light, which propagates within the waveguiding plate SUB1 along the first route. The first route may be e.g. a clockwise route. The wave vectors of the input light IN1 may be within a region BOX0 of the wave vector space defined by elementary wave vectors $k_x$ and $k_y$. Each corner of the region BOX0 may represent a wave vector of light of a corner point of input image IMG0 (FIG. 7a).

The wave vectors of the first guided light B1a may be within a region BOX1a.

The wave vectors of the third guided light B2a may be within a region BOX2a.

The wave vectors of the first output light OB3a may be within a region BOX3.

The in-coupling element DOE1 may form the first guided light B1a by diffracting the input light IN1. The diffraction may be represented by adding the grating vector $m_{1a}$ V1a of the in-coupling element DOE1 to the wave vectors of the input light IN1. The wave vectors of the first guided light B1a may be determined by adding the grating vector $m_{1a}$ V1a to the wave vectors of the input light IN1. The wave vectors of the third guided light B2a may be determined by adding the grating vector $m_{2a}$ V2a to the wave vectors of the first guided light B1a. The wave vectors of the out-coupled light OB3a may be determined by adding the grating vector $m_{3a}$ V3a to the wave vectors of the second guided light B2a.

BND1 denotes a first boundary for fulfilling the criterion of total internal reflection (TIR) in the waveguiding plate SUB1. BND2 denotes a second boundary of maximum wave vector in the waveguiding plate SUB1. The maximum wave vector may be determined by the refractive index of the substrate. Light may be waveguided in the plate SUB1 only when the wave vector of said light is in the region ZONE1 between the first boundary BND1 and the second boundary BND2. The light may leak out of the plate or not propagate at all if the wave vector of the light is outside the region ZONE1.

The grating period $d_{1a}$ of the in-coupling element DOE1 may be selected e.g. such that all wave vectors of the first blue guided light B1a are within the region ZONE1 defined by the boundaries BND1, BND2.

Figure 6B:
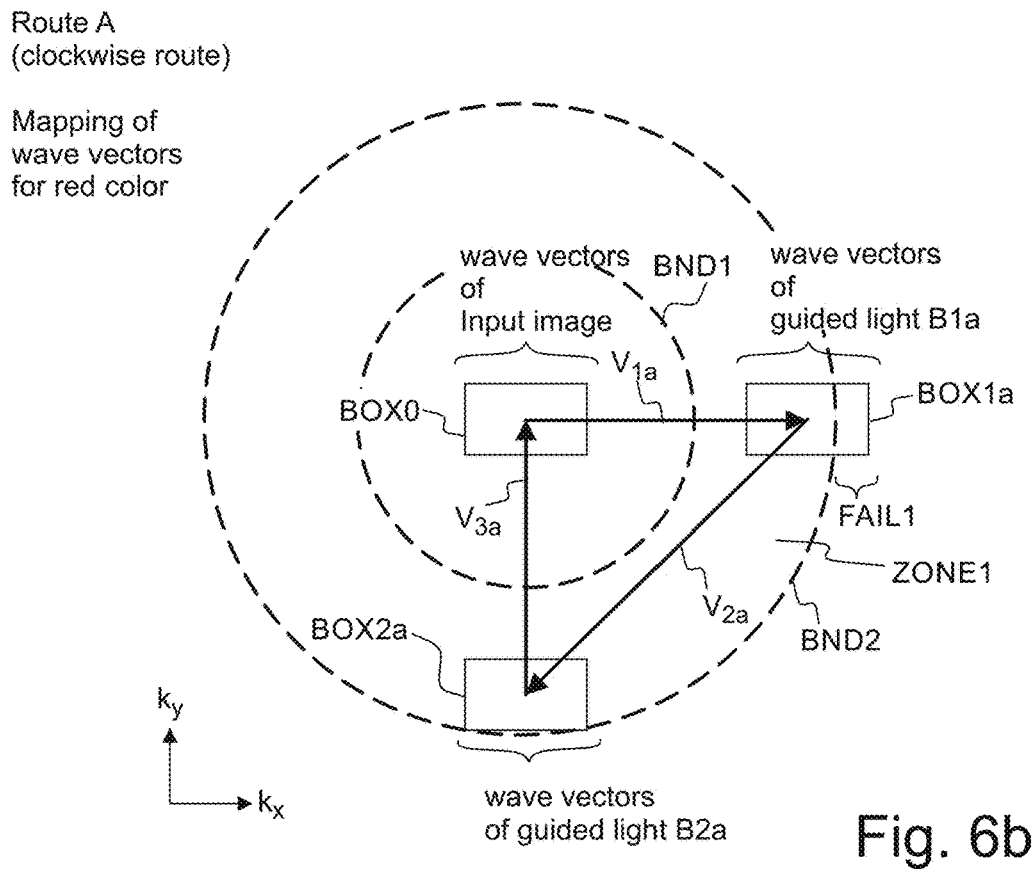
FIG. 6b shows, by way of example, mapping of wave vector values for red light, which propagates along the first route of the expander device.

FIG. 6b shows, by way of example, mapping of wave vectors for red light, which propagates within the waveguiding plate SUB1 along the first route.

Now, if the grating period $d_{1a}$ of the in-coupling element DOE1 has been selected such that all wave vectors of the first blue guided light B1a are within the region ZONE1, then the wave vectors of red light of some corner points may be outside the region ZONE1. In other words, the waveguiding plate SUB1 cannot confine or guide the red light of some corner points of the input image IMG0.

Wave vectors residing within the sub-region FAIL1 of the region BOX1a may correspond to a situation where the input element DOE1 fails to form guided light by diffracting input light. In other words, the diffraction equation does not provide a real practical solution for wave vectors residing within the sub-region FAIL1 of the region BOX1a. Thus, for some image points, it is not possible to couple red light into the substrate, in a situation where the wave vectors of guided light would be outside the region ZONE1.

For some (other) image points, the leaking of the red light may limit the angular width of the displayed virtual image VIMG1, in a situation where the wave vectors of guided light would be outside the region ZONE1.

Thus, the boundaries BND1, BND2 of the region ZONE1 may limit the angular width ($\Delta\varphi$) of the displayed virtual image VIMG1. Formation of a wave vector, which is outside the region ZONE1 may mean leakage of light out of the substrate or failed coupling of light into the substrate.

$k_x$ denotes a direction in the wave vector space, wherein the direction $k_x$ is parallel with the direction SX of the real space. $k_y$ denotes a direction in the wave vector space, wherein the direction $k_y$ is parallel with the direction SY of the real space. The symbol $k_z$ (not shown in the drawings) denotes a direction in the wave vector space, wherein the direction $k_z$ is parallel with the direction SZ of the real space. A wave vector k may have components in the directions $k_x$, $k_y$, and/or $k_z$.

Figure 6C:
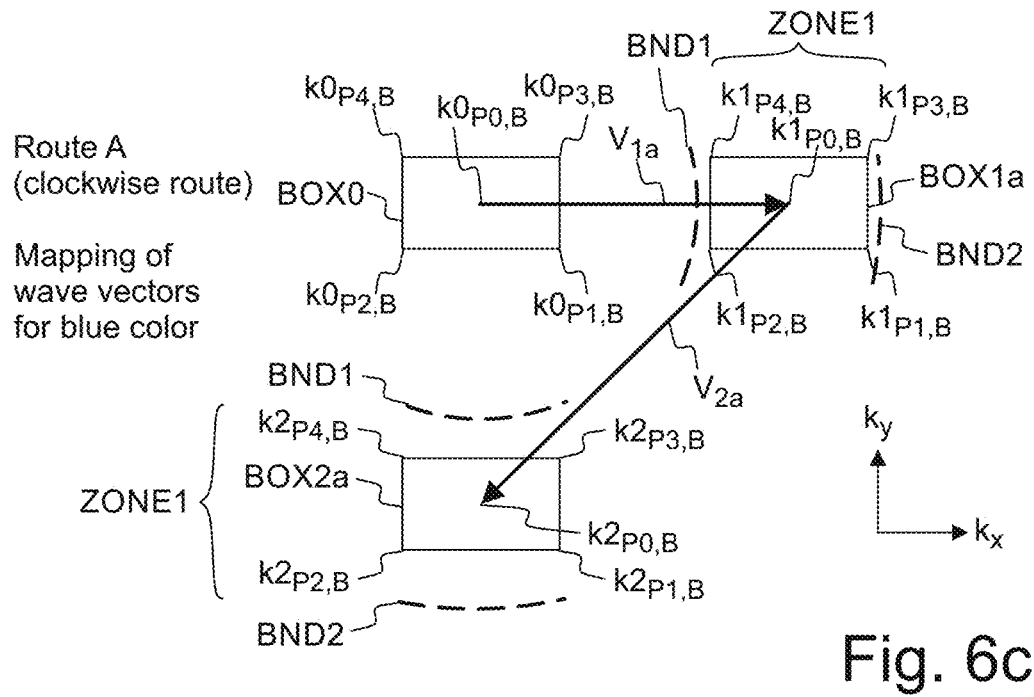
FIG. 6c shows, by way of example, mapping of wave vector values for blue light of the corner points of the displayed image.
Figure 6D:
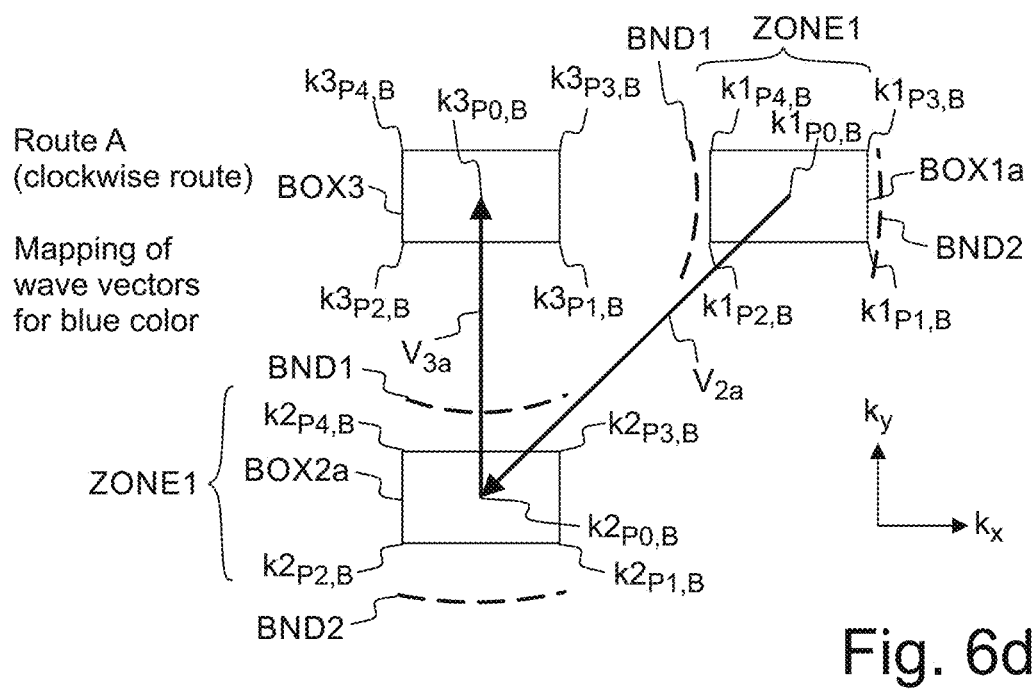
FIG. 6d shows, by way of example, mapping of wave vector values for blue light of the corner points of the displayed image.

FIGS. 6c and 6d show, by way of example, the wave vectors of blue light of the image points (P0, P1, P2, P3, P4) in the wave vector space.

Figure 6E:
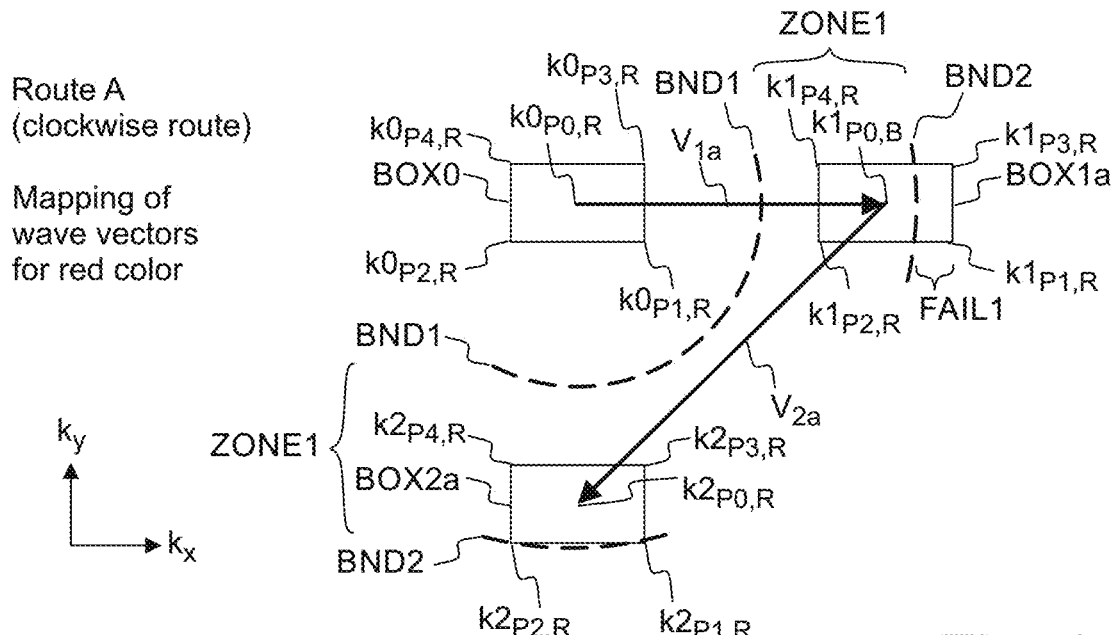
FIG. 6e shows, by way of example, mapping of wave vector values for red light of the corner points of the displayed image.
Figure 6F:
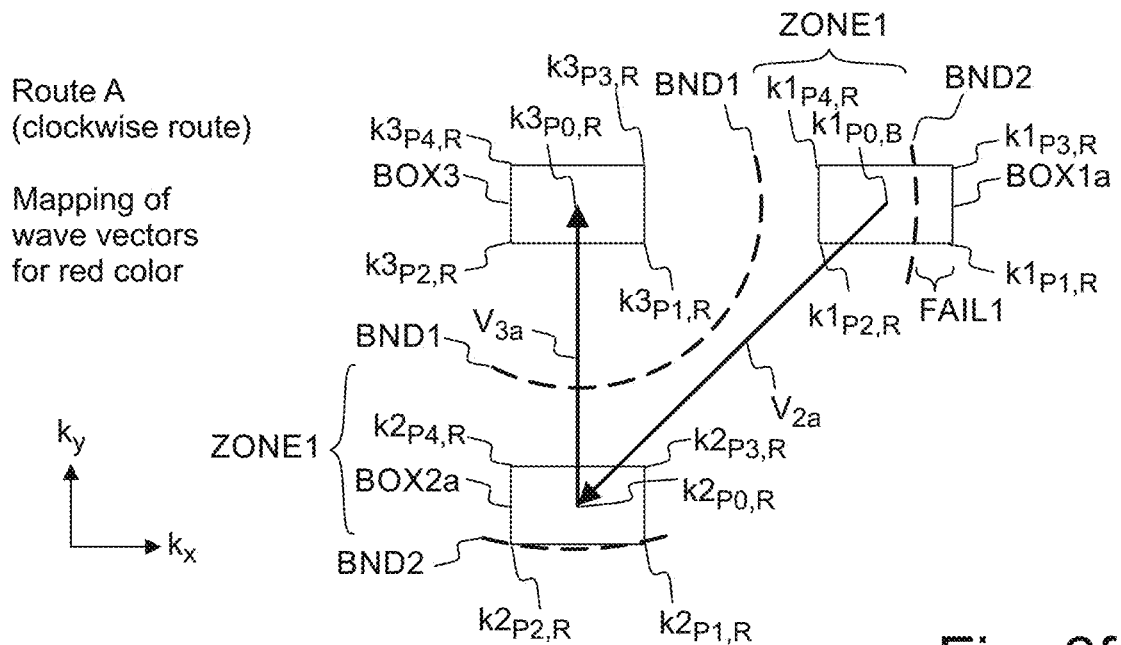
FIG. 6f shows, by way of example, mapping of wave vector values for red light of the corner points of the displayed image.

FIGS. 6e and 6f show, by way of example, the wave vectors of red light of the image points (P0, P1, P2, P3, P4) in the wave vector space.

Figure 6G:
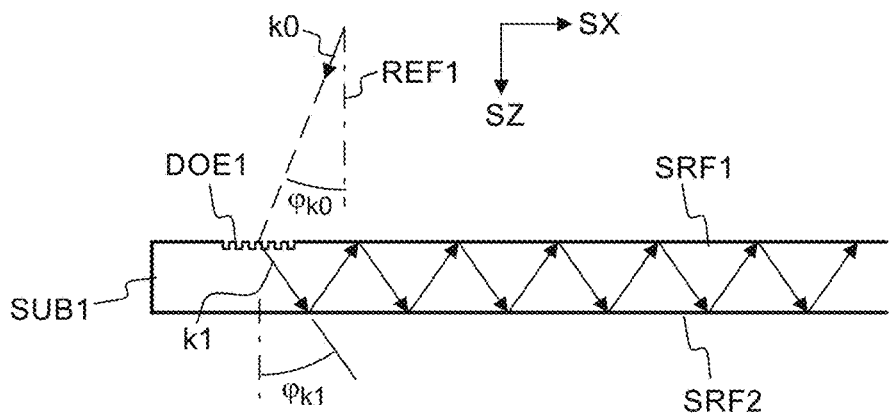
FIG. 6g shows, by way of example, in a cross-sectional side view, forming first guided light by coupling input light into the substrate, wherein the inclination angle of the first guided light is close to the critical angle of total internal reflection.

FIG. 6g shows, by way of example, in a cross-sectional side view, forming first guided light by coupling input light into the substrate, wherein the inclination angle $\varphi_{k1}$ of the first guided light is close to the critical angle $\varphi_{CR,SUB1}$ of total internal reflection. The situation of FIG. 6g may correspond to operation near the first boundary BND1 of the region ZONE1.

Figure 6H:
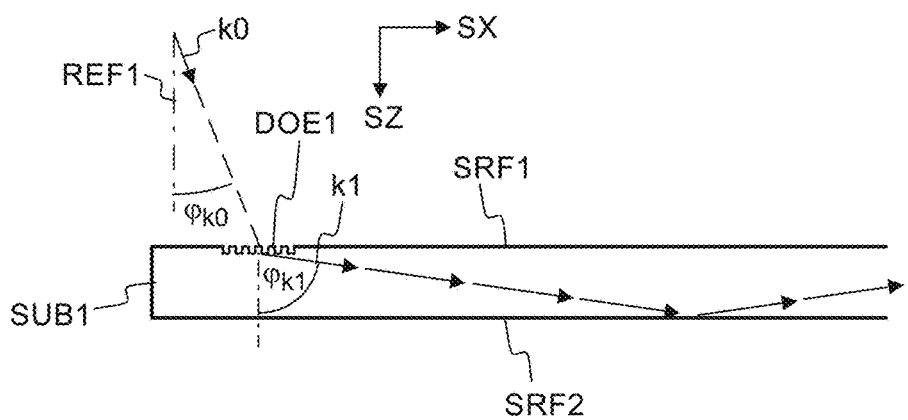
FIG. 6h shows, by way of example, in a cross-sectional side view, forming first guided light by coupling input light into the substrate, wherein the inclination angle of the first guided light is close to 90 degrees.

FIG. 6h shows, by way of example, in a cross-sectional side view, forming first guided light by coupling input light into the substrate, wherein the inclination angle $\varphi_{k1}$ of the first guided light is close to 90 degrees. The situation of FIG. 6h may correspond to operation near the second boundary BND2 of the region ZONE1.

Figure 6I:
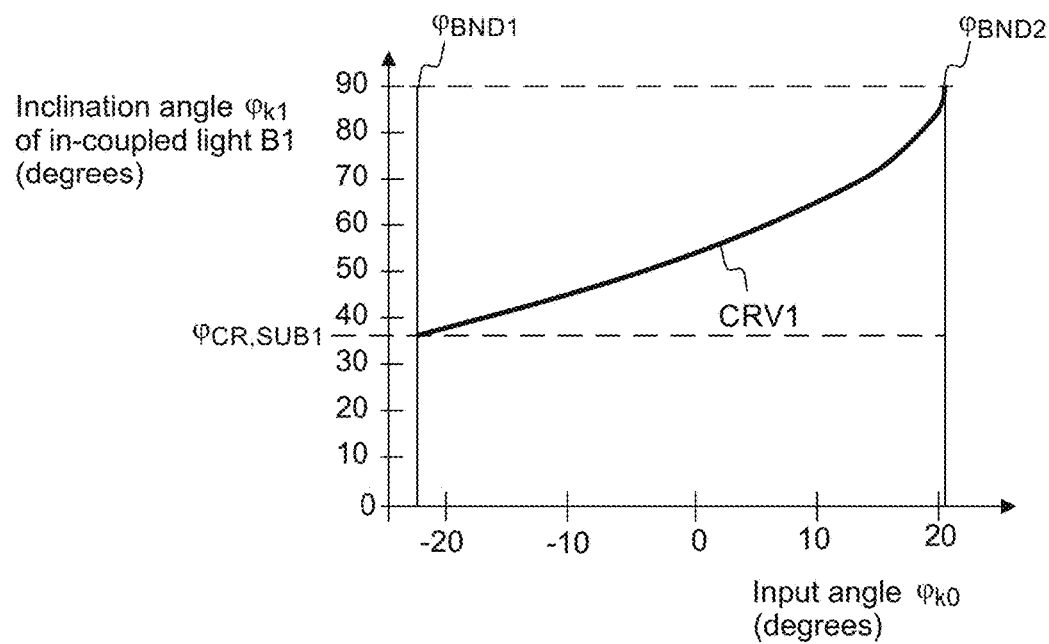
FIG. 6i shows, by way of example, the inclination angle of wave vector of first guided light as a function of input angle of the wave vector of input light.

The curve CRV1 of FIG. 6i shows, by way of example, the inclination angle $\varphi_{k1}$ of the wave vector k1 of first guided light B1a as a function of input angle $\varphi_{k0}$ of the wave vector k0 of input light B0. The inclination angle $\varphi_{k1}$ may mean the angle between the wave vector and the reference plane REF1 defined by the directions SZ and SY. The inclination angle $\varphi_{k1}$ may be calculated from the input angle $\varphi_{k0}$, from the grating period of the input element DOE1, and from the refractive index of the substrate SUB1 e.g. by using the diffraction equation. A first angular limit $\varphi_{BND1}$ may correspond to a situation where the inclination angle $\varphi_{k1}$ of the first guided light is equal to the critical angle $\varphi_{CR,SUB1}$ of total internal reflection. A second angular limit $\varphi_{BND2}$ may correspond to a situation where the inclination angle $\varphi_{k1}$ of the first guided light is equal to 90 degrees.

FIG. 7a shows, by way of example, mapping of wave vectors for blue light, which propagates within the waveguiding plate SUB1 along the second route. The second route may be e.g. a counter-clockwise route.

Figure 7B:
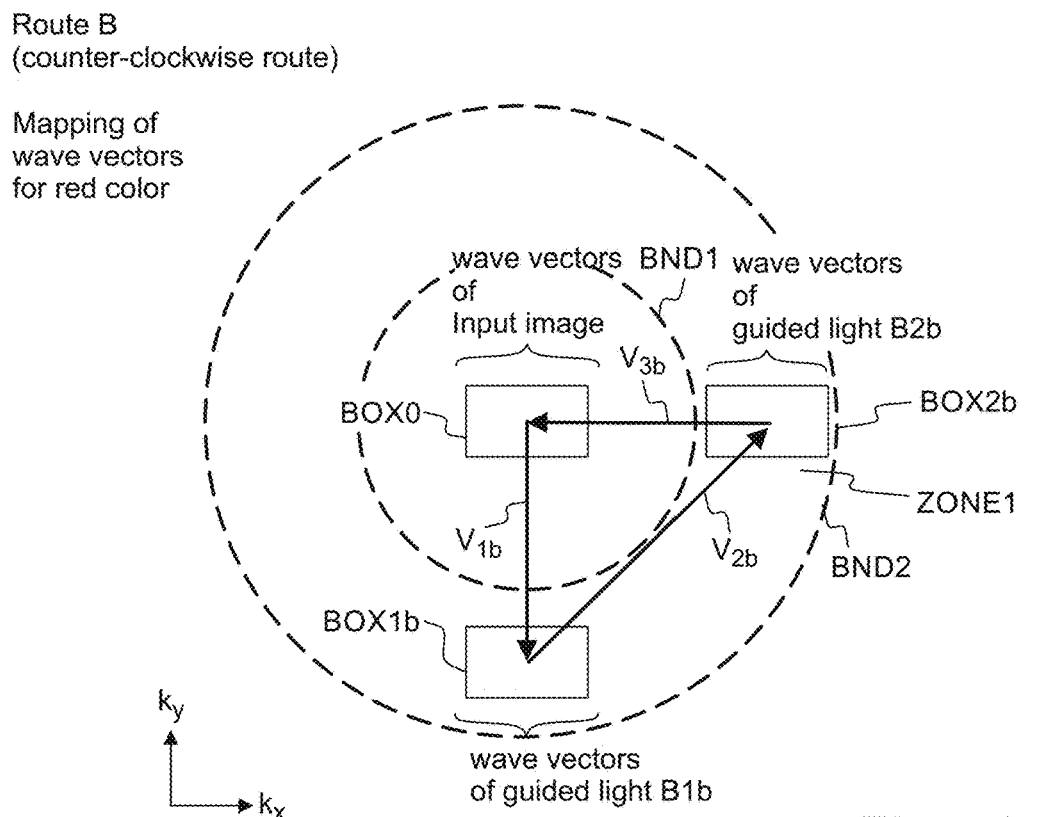
FIG. 7b shows, by way of example, mapping of wave vector values for red light, which propagates along the second route of the expander device.

FIG. 7b shows, by way of example, mapping of wave vectors for red light, which propagates within the waveguiding plate SUB1 along the second route.

Figure 7C:
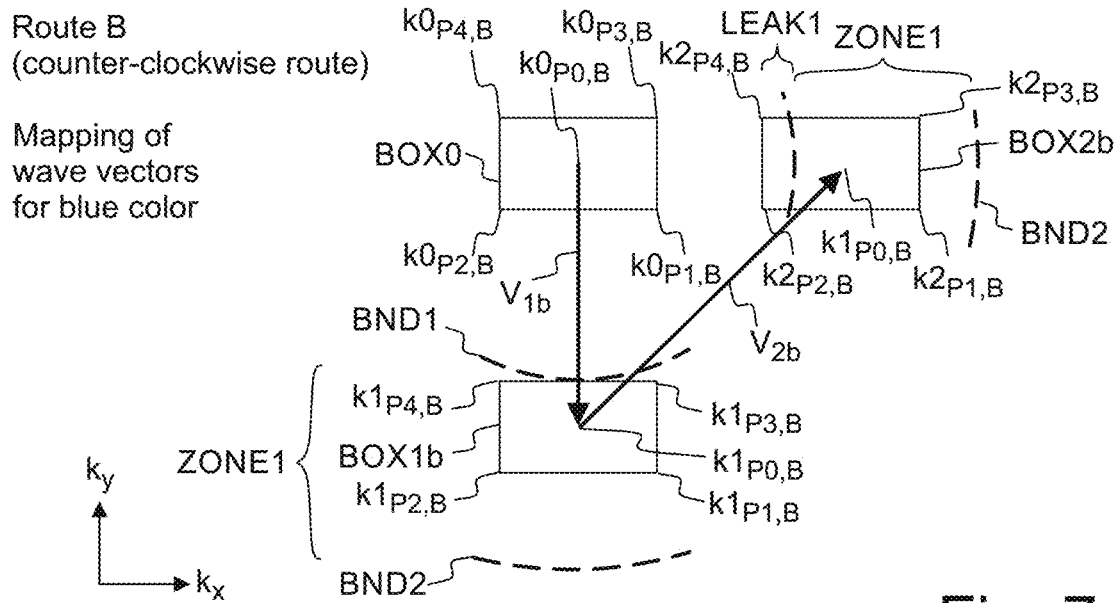
FIG. 7c shows, by way of example, mapping of wave vector values for blue light of the corner points of the displayed image.
Figure 7D:
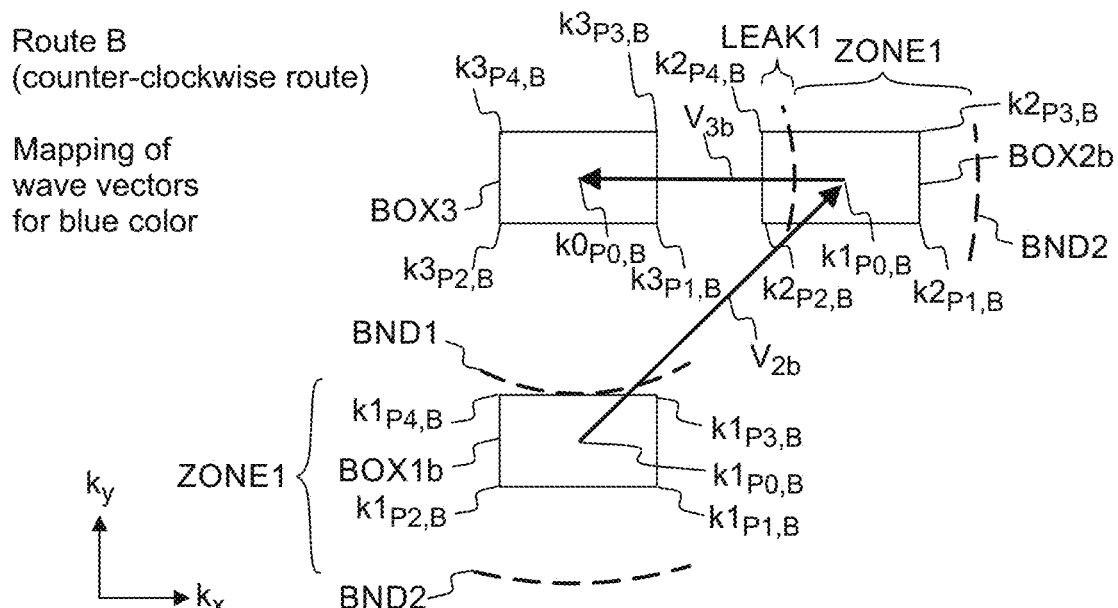
FIG. 7d shows, by way of example, mapping of wave vector values for blue light of the corner points of the displayed image.

FIGS. 7c and 7d show, by way of example, the wave vectors of blue light of the image points (P0, P1, P2, P3, P4) in the wave vector space.

The grating period dib of the in-coupling element DOE1 may be selected e.g. such that all wave vectors of the second red guided light B1b are within the region ZONE1 defined by the boundaries BND1, BND2.

Now, if the grating period dib of the in-coupling element DOE1 has been selected such that all wave vectors of the second red guided light B1b are within the region ZONE1, then the wave vectors of blue light of some corner points may be outside the region ZONE1. In other words, the waveguiding plate SUB1 cannot confine the blue light of some corner points of the input image IMG0. The leaking of the blue light may limit the angular width of the displayed virtual image VIMG1. The wave vectors residing in the sub-region LEAK1 of the region BOX2b may represent light, which is not confined to the substrate by total internal reflection.

However, the expander device EPE1 may be arranged to provide both the first route and the second route. The first route may provide the full width ($\Delta\varphi$) of the displayed image VIMG1 at the blue color, and the second route may provide the same full width ($\Delta\varphi$) of the displayed image VIMG1 at the red color. Consequently, the expander device EPE1 may be arranged to display a multi-color virtual image VIMG1, which has the full width ($\Delta\varphi$).

Consequently, the expander device EPE1 may be arranged to display all corner points (P1, P2, P3, P4) of the multi-color virtual image VIMG1 in red color and in blue color, wherein said multi-color virtual image VIMG1 has the full width ($\Delta\varphi$).

Consequently, the angular width ($\Delta\varphi$) of the multi-color virtual image VIMG1 displayed by using the two routes may be substantially greater than a maximum angular width (LIM1) of another multi-color virtual image, which can be displayed by a comparative device (EPE0) without using the second route.

The expander device EPE1 with the two routes may be arranged to display a multi-color virtual image VIMG1, which has an extended angular width ($\Delta\varphi$). The first route may be arranged to confine the blue color components of the input image, while allowing leakage of red light of one or more corner points of the input image. The second route may be arranged to confine the red color components of the input image, while allowing leakage of blue light of one or more corner points of the input image.

For example, in an instance in which the input light (IN1) corresponds to an input image (IMG0), and the width ($\Delta\varphi$) of the input image (IMG0) is greater than a predetermined limit (LIM1), the in-coupling element (DOE1) may be arranged to provide:
  red light (B1aP1,R) which corresponds to a first corner point (P1) of an input image (IMG0),
    wherein the grating vectors (m1aV1a, m2aV2a, m3aV3a, m1bV1b, m2bV2b, m3bV3b) of the elements (DOE1, DOE2a, DOE2b, DOE3) have been selected such that:

the red light of the first corner point (P1) is guided from the in-coupling element (DOE1) to the out-coupling element (DOE3) via the second expander element (DOE2b), the red light of the first corner point (P1) is not guided from the in-coupling element (DOE1) to the out-coupling element (DOE3) via the first expander element (DOE2a).

For example, in an instance in which the input light (IN1) corresponds to an input image (IMG0), and the width (Δφ) of the input image (IMG0) is greater than a predetermined limit (LIM1), the in-coupling element (DOE1) may be arranged to provide:

blue light (B1bP2,B) which corresponds to a second corner point (P2) of the input image (IMG0), wherein the grating vectors (m1aV1a, m2aV2a, m3aV3a, m1bV1b, m2bV2b, m3bV3b) of the elements (DOE1, DOE2a, DOE2b, DOE3) have been selected such that:

the blue light of the second corner point (P2) is guided from the in-coupling element (DOE1) to the out-coupling element (DOE3) via the first expander element (DOE2a), and the blue light of the second corner point (P2) is not guided from the in-coupling element (DOE1) to the out-coupling element (DOE3) via the second expander element (DOE2b).

For example, in an instance in which the input light (IN1) corresponds to an input image (IMG0), and the width (Δφ) of the input image (IMG0) is greater than a predetermined limit (LIM1), the in-coupling element (DOE1) may be arranged to provide:

red light (B1aP1,R) which corresponds to a first corner point (P1) of an input image (IMG0), blue light (B1bP2,B) which corresponds to a second corner point (P2) of the input image (IMG0), wherein the grating vectors (m1aV1a, m2aV2a, m3aV3a, m1bV1b, m2bV2b, m3bV3b) of the elements (DOE1, DOE2a, DOE2b, DOE3) have been selected such that:

the red light of the first corner point (P1) is guided from the in-coupling element (DOE1) to the out-coupling element (DOE3) via the second expander element (DOE2b), the red light of the first corner point (P1) is not guided from the in-coupling element (DOE1) to the out-coupling element (DOE3) via the first expander element (DOE2a), the blue light of the second corner point (P2) is guided from the in-coupling element (DOE1) to the out-coupling element (DOE3) via the first expander element (DOE2a), and the blue light of the second corner point (P2) is not guided from the in-coupling element (DOE1) to the out-coupling element (DOE3) via the second expander element (DOE2b).

For example, in an instance in which the input light (IN1) corresponds to an input image (IMG0), and the width (Δφ) of the input image (IMG0) is greater than a predetermined limit (LIM1), the in-coupling element (DOE1) may be arranged to provide:

red light (B1aP1,R) which corresponds to a first corner point (P1) of an input image (IMG0), blue light (B1aP1,B) which corresponds to the first corner point (P1) of the input image (IMG0), red light (B1bP2,R) which corresponds to a second corner point (P2) of the input image (IMG0), blue light (B1bP2,B) which corresponds to the second corner point (P2) of the input image (IMG0), wherein the grating vectors (m1aV1a, m2aV2a, m3aV3a, m1bV1b, m2bV2b, m3bV3b) of the elements (DOE1, DOE2a, DOE2b, DOE3) have been selected such that:

the red light of the first corner point (P1) is guided from the in-coupling element (DOE1) to the out-coupling element (DOE3) via the second expander element (DOE2b), the red light of the first corner point (P1) is not guided from the in-coupling element (DOE1) to the out-coupling element (DOE3) via the first expander element (DOE2a), the blue light of the first corner point (P1) is guided from the in-coupling element (DOE1) to the out-coupling element (DOE3) via the first expander element (DOE2a), the blue light of the first corner point (P1) is guided from the in-coupling element (DOE1) to the out-coupling element (DOE3) via the second expander element (DOE2a), the red light of the second corner point (P2) is guided from the in-coupling element (DOE1) to the out-coupling element (DOE3) via the first expander element (DOE2a), the red light of the second corner point (P2) is guided from the in-coupling element (DOE1) to the out-coupling element (DOE3) via the second expander element (DOE2b), the blue light of the second corner point (P2) is guided from the in-coupling element (DOE1) to the out-coupling element (DOE3) via the first expander element (DOE2a), and the blue light of the second corner point (P2) is not guided from the in-coupling element (DOE1) to the out-coupling element (DOE3) via the second expander element (DOE2b).

The device EPE1 may be arranged to operate such that the wave vectors of blue guided light reside within the region ZONE1 in a situation where the blue guided light propagates via a first route of the device EPE1, and the device EPE1 may be arranged to operate such that the wave vectors of red guided light reside within the region ZONE1 in a situation where the red guided light propagates via a second route of the device EPE1.

Figure 8A:
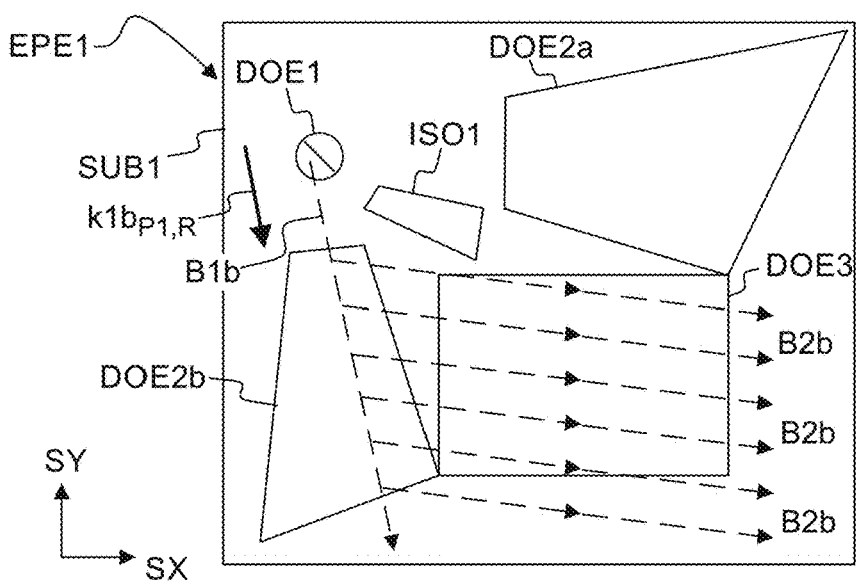
FIG. 8a shows, by way of example, in a front view, propagation of light of a first corner point.

FIG. 8a shows, by way of example, propagation of light of a corner point P1 in the waveguiding plate SUB1.

Figure 8B:
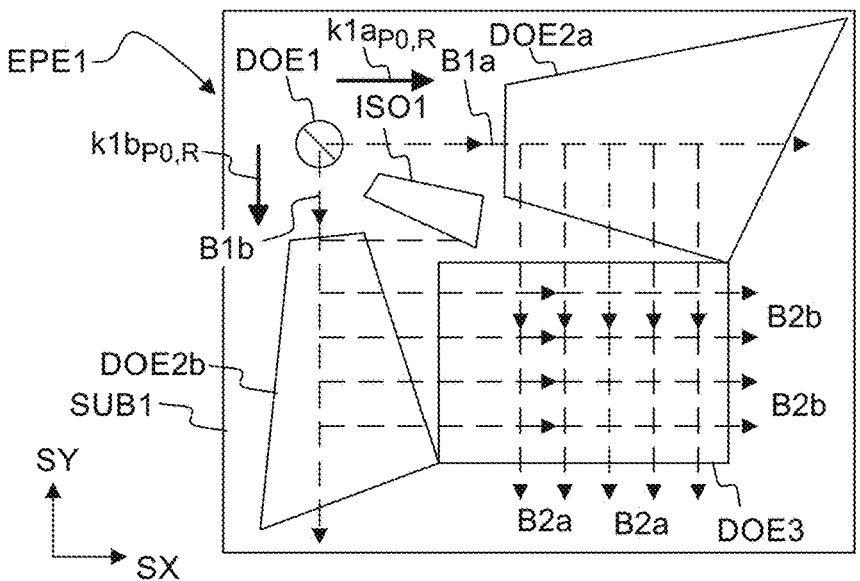
FIG. 8b shows, by way of example, in a front view, propagation of light of a center point.

FIG. 8b shows, by way of example, propagation of light of a center point P0 in the waveguiding plate SUB1.

Figure 8C:
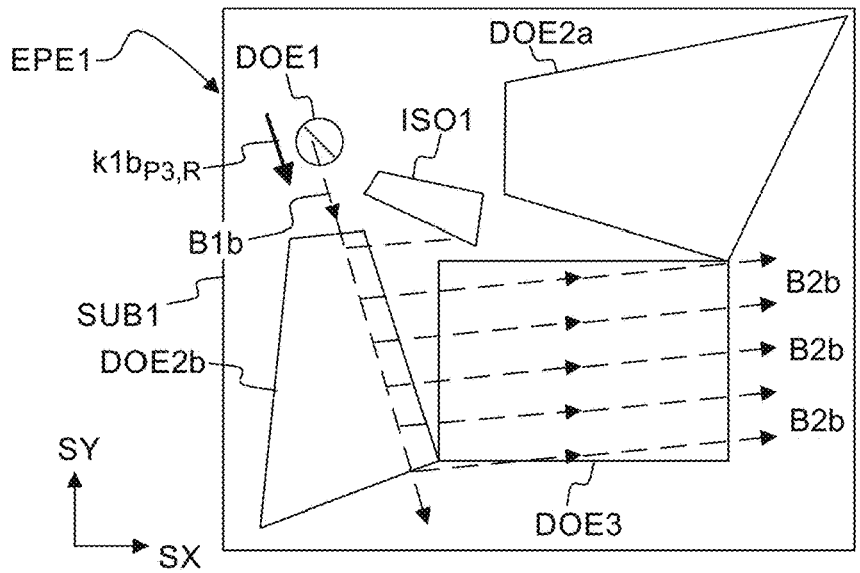
FIG. 8c shows, by way of example, in a front view, propagation of light of a third corner point.

FIG. 8c shows, by way of example, propagation of light of a corner point P3 in the waveguiding plate SUB1.

Figure 8D:
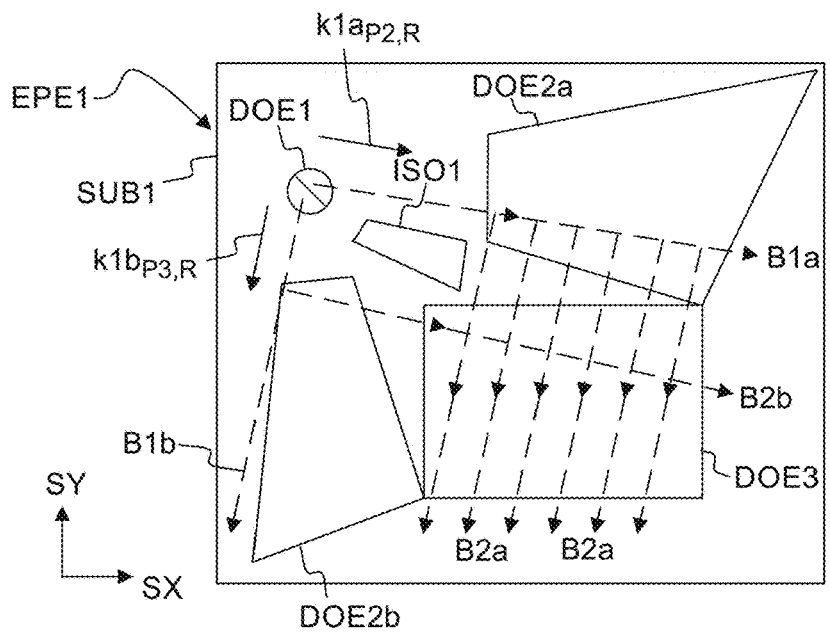
FIG. 8d shows, by way of example, in a front view, propagation of light of a second corner point.

FIG. 8d shows, by way of example, propagation of light of a corner point P2 in the waveguiding plate SUB1.

Figure 8E:
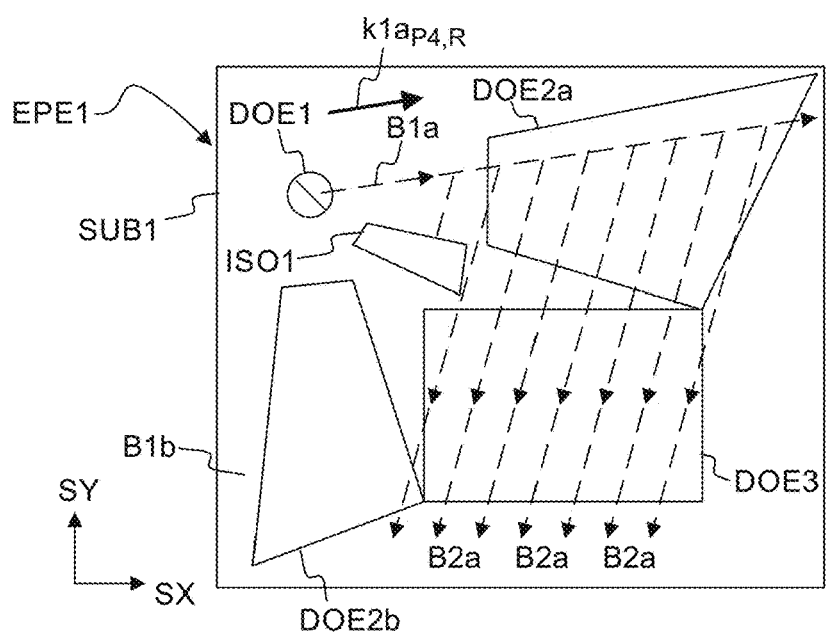
FIG. 8e shows, by way of example, in a front view, propagation of light of a fourth corner point.

FIG. 8e shows, by way of example, propagation of light of a corner point P4 in the waveguiding plate SUB1.

The display apparatus 500 may be e.g. a virtual reality device 500. The display apparatus 500 may be e.g. an augmented reality device 500. The display apparatus 500 may be a near eye device. The apparatus 500 may be a wearable device, e.g. a headset. The apparatus 500 may comprise e.g. a headband by which the apparatus 500 may be worn on a user's head. During operation of apparatus 500, the out-coupling element DOE3 may be positioned e.g. in front of the user's left eye EYE1 or right EYE1. The apparatus 500 may project output light OUT1 into the user's eye EYE1. In an embodiment, the apparatus 500 may comprise two engines ENG1 and/or two extender devices EPE1 to display stereo images. In an augmented reality device 500, the viewer may also see real objects and/or environment through the expander device EPE1, in addition to the displayed virtual images. The engine ENG1 may be arranged to generate still images and/or video. The engine ENG1 may generate a real primary image IMG0 from a digital image. The engine ENG1 may receive one or more digital images e.g. from an internet server or from a smartphone. The apparatus 500 may be a smartphone. The displayed image may be viewed by a human. The displayed image may also be viewed e.g. by an animal, or by a machine (which may comprise e.g. a camera).

The term k-vector may mean the same as the term wave vector.

For the person skilled in the art, it will be clear that modifications and variations of the devices and methods according to the present invention are perceivable. The figures are schematic. The particular embodiments described above with reference to the accompanying drawings are illustrative only and not meant to limit the scope of the invention, which is defined by the appended claims.

What is claimed is:

1. An optical device (EPE1) comprising a waveguide plate (SUB1), which in turn comprises:
   an in-coupling element (DOE1) to form first guided light (B1$a$) and second guided light (B1$b$) by diffracting input light (IN1) from a first grating (G1$a$) and a second grating (G1$b$) of the in-coupling element (DOE1) respectively,
   a first expander element (DOE2$a$) to form third guided light (B2$a$) by diffracting the first guided light (B1$a$) from a grating (G2$a$) of the first expander element (DOE2$a$),
   a second expander element (DOE2$b$) to form fourth guided light (B2$b$) by diffracting the second guided light (B1$b$) from a grating (G2$b$) of the second expander element (DOE2$b$), and
   an out-coupling element (DOE3) to form first output light (OB3$a$) by diffracting the third guided light (B2$a$) from a first grating (G3$a$) of the out-coupling element (DOE3), and to form second output light (OB3$b$) by diffracting the fourth guided light (B2$b$) from a second grating (G3$b$) of the out-coupling element (DOE3),
   wherein the out-coupling element (DOE3) is arranged to form combined output light (OUT1) by combining the first output light (OB3$a$) with the second output light (OB3$b$),
   wherein the first grating (G1$a$) of the in-coupling element (DOE1) has a first grating period ($d_{1a}$) for forming the first guided light (B1$a$), and wherein the second grating (G1$b$) of the in-coupling element (DOE1) has a second different grating period ($d_{1b}$) for forming the second guided light (B1$b$), and
   the waveguide plate (SUB1) further comprises one or more optically isolating elements (ISO1) to prevent direct optical coupling between the first expander element (DOE2$a$) and the second expander element (DOE2$b$), wherein the one or more optically isolating elements (ISO1) are a black absorbing material,
   wherein the first and second gratings (G1$a$, G1$b$) of the in-coupling element (DOE1), the grating (G2$a$) of the first expander element (DOE2$a$), the grating (G2$b$) of the second expander element (DOE2$b$), the first and second gratings (G3$a$, G3$b$) of the out-coupling element (DOE3), and the one or more optically isolating elements (ISO1) are all provided on a same surface of the waveguide plate (SUB1).

2. The device (EPE1) of claim 1, wherein the first expander element (DOE2$a$) has a third grating period ($d_{2a}$) for forming the third guided light (B1$a$), the second expander element (DOE2$b$) has a fourth grating period ($d_{2b}$) for forming the fourth guided light (B2$b$), wherein the third grating period ($d_{2a}$) is different from the fourth grating period ($d_{2b}$).

3. The device (EPE1) of claim 1, wherein, in an instance in which the input light (IN1) corresponds to an input image (IMG0), and the width ($\Delta\varphi$) of the input image (IMG0) is greater than a predetermined limit (LIM1), the in-coupling element (DOE1) may be arranged to provide:
   red light (B1$a_{P1,R}$) which corresponds to a first corner point (P1) of an input image (IMG0),
   wherein the grating vectors ($m_{1a}V_{1a}$, $m_{2a}V_{2a}$, $m_{3a}V_{3a}$, $m_{1b}V_{1b}$, $m_{2b}V_{2b}$, $m_{3b}V_{3b}$) of the elements (DOE1, DOE2$a$, DOE2$b$, DOE3) have been selected such that:
   the red light of the first corner point (P1) is guided from the in-coupling element (DOE1) to the out-coupling element (DOE3) via the second expander element (DOE2$b$),
   the red light of the first corner point (P1) is not guided from the in-coupling element (DOE1) to the out-coupling element (DOE3) via the first expander element (DOE2$a$).

4. The device (EPE1) according to claim 1, wherein, in an instance in which the input light (IN1) corresponds to an input image (IMG0), and the width ($\Delta\varphi$) of the input image (IMG0) is greater than a predetermined limit (LIM1), the in-coupling element (DOE1) is arranged to provide:
   red light (B1$a_{P1,R}$) which corresponds to a first corner point (P1) of an input image (IMG0), blue light (B1$b_{P2,B}$) which corresponds to a second corner point (P2) of the input image (IMG0),
   wherein the grating vectors ($m_{1a}V_{1a}$, $m_{2a}V_{2a}$, $m_{3a}V_{3a}$, $m_{1b}V_{1b}$, $m_{2b}V_{2b}$, $m_{3b}V_{3b}$) of the elements (DOE1, DOE2$a$, DOE2$b$, DOE3) have been selected such that:
   the red light of the first corner point (P1) is guided from the in-coupling element (DOE1) to the out-coupling element (DOE3) via the second expander element (DOE2$b$),
   the red light of the first corner point (P1) is not guided from the in-coupling element (DOE1) to the out-coupling element (DOE3) via the first expander element (DOE2$a$),
   the blue light of the second corner point (P2) is guided from the in-coupling element (DOE1) to the out-coupling element (DOE3) via the first expander element (DOE2$a$), and
   the blue light of the second corner point (P2) is not guided from the in-coupling element (DOE1) to the out-coupling element (DOE3) via the second expander element (DOE2$b$).

5. The device (EPE1) according to claim 1, wherein the first guided light (B1$a$) comprises light (B1$a_{P0}$) which corresponds to a center point (P0) of the input image (IMG0),
   the second guided light (B1$b$) comprises light (B1$b_{P0}$) which corresponds to the center point (P0) of the input image (IMG0),
   the third guided light (B2$a$) comprises light (B2$a_{P0}$) which corresponds to a center point (P0) of the input image (IMG0),
   the fourth guided light (B2$b$) comprises light (B2$b_{P0}$) which corresponds to the center point (P0) of the input image (IMG0), wherein the out-coupling element (DOE3) is arranged to:
form a first output light beam (OB3a) by diffracting light, which corresponds to the center point (P0) of the input image (IMG0),
form a second output light beam (OB3b) by diffracting light, which corresponds to the center point (P0) of the input image (IMG0),
wherein the first output light beam (OB3a) and the second output light beam (OB3b) propagate in a direction ($k0_{P0}$), which corresponds to the center point (P0).

6. The device (EPE1) according to claim 1, wherein the in-coupling element (DOE1) is arranged to diffract the input light (IN1) such that the first guided light (B1a) comprises light of a center point (P0) of an input image (IMG0), and such that the second guided light (B1b) comprises light of the center point (P0),
wherein the out-coupling element (DOE3) is arranged to diffract the third guided light (B2a) received from the first expander element (DOE2a) such that the first output light (OB3a) comprises light of the center point (P0),
wherein the out-coupling element (DOE3) is arranged to diffract the fourth guided light (B2b) received from the second expander element (DOE2b) such that the second output light (OB3b) comprises light of the center point (P0),
wherein the light of the center point (P0) in the first output light (OB3a) propagates in an axial direction (k3,P0),
wherein the light of the center point (P0) in the second output light (OB3b) propagates in the same axial direction (k3,P0).

7. The device (EPE1) of claim 6, wherein the light of the center point (P0) in the first guided light (B1a) propagates in a first direction ($k1a_{P0}$), wherein the light of the center point (P0) in the second guided light (B1b) propagates in a second direction ($k1b_{P0}$), wherein the angle ($\gamma_{AB}$) between the first direction ($k1a_{P0}$) and the second direction ($k1b_{P0}$) is in the range of 60° to 120°.

8. The device (EPE1) of claim 6, wherein a first region (REG3a) of the out-coupling element (DOE3) is arranged to out-couple light of the center point (P0) received from the first expander element (DOE2a), a second region (REG3b) of the out-coupling element (DOE3) is arranged to out-couple light of the center point (P0) received from the second expander element (DOE2b), wherein the first region (REG3a) overlaps the second region (REG3a) such that the common overlapping area (COM1) of the first region (REG3a) and the second region (REG3b) is greater than 50% of the one-sided area of the out-coupling element (DOE3).

9. A display apparatus (500) comprising an optical engine (ENG1) to form a primary image (IMG0) and to convert the primary image (IMG0) into a plurality of input light beams of the input light (IN1), the display apparatus (500) comprising the device (EPE1) according to claim 1 to form light beams of output light (OUT1) by diffractively expanding the input light beams of the input light (IN1).

10. A method comprising using the optical device (EPE1) according to claim 1 to provide the output light (OUT1),
providing the optical device (EPE1) which comprises the waveguide plate (SUB1), which in turn comprises the in-coupling element (DOE1), the first expander element (DOE2a), the second expander element (DOE2b), the out-coupling element (DOE3), and the one or more optically isolating elements (ISO1),
forming the first guided light (B1a) by diffracting the input light (IN1) from the first grating (G1a) of the in-coupling element (DOE1) having the first grating period ($d_{1a}$),
forming the second guided light (B1b) by diffracting the input light (IN1) from the second grating (G1b) of the in-coupling element (DOE1) having the second different grating period ($d_{1b}$),
forming the third guided light (B2a) by diffracting the first guided light (B1a) from the grating (G2a) of the first expander element (DOE2a),
forming the fourth guided light (B2b) by diffracting the second guided light (B1b) from the grating (G2b) of the second expander element (DOE2b),
forming the first output light (OB3a) by diffracting the third guided light (B2a) from the first grating (G3a) of the out-coupling element (DOE3),
forming the second output light (OB3b) by diffracting the fourth guided light (B2b) from the second grating (G3b) of the out-coupling element (DOE3), and
providing the output light (OUT1) by combining the first output light (OB3a) with the second output light (OB3b),
the method further comprising:
optically isolating the first expander element (DOE2a) and the second expander element (DOE2b) by the one or more optically isolating elements (ISO1), thereby preventing direct optical coupling between the first expander element (DOE2a) and the second expander element (DOE2b), wherein the one or more optically isolating elements (ISO1) are a black absorbing material.

11. A method comprising using the optical device (EPE1) according to claim 1 to display an image (VIMG1),
providing the optical device (EPE1) which comprises the waveguide plate (SUB1), which in turn comprises the in-coupling element (DOE1), the first expander element (DOE2a), the second expander element (DOE2b), the out-coupling element (DOE3), and the one or more optically isolating elements (ISO1),
forming the first guided light (B1a) by diffracting the input light (IN1) from the first grating (G1a) of the in-coupling element (DOE1) having the first grating period ($d_{1a}$),
forming the second guided light (B1b) by diffracting the input light (IN1) from the second grating (G1b) of the in-coupling element (DOE1) having the second different grating period ($d_{1b}$),
forming the third guided light (B2a) by diffracting the first guided light (B1a) from the grating (G2a) of the first expander element (DOE2a),
forming the fourth guided light (B2b) by diffracting the second guided light (B1b) from the grating (G2b) of the second expander element (DOE2b),
forming the first output light (OB3a) by diffracting the third guided light (B2a) from the first grating (G3a) of the out-coupling element (DOE3),
forming the second output light (OB3b) by diffracting the fourth guided light (B2b) from the second grating (G3b) of the out-coupling element (DOE3),
forming the output light (OUT1) by combining the first output light (OB3a) with the second output light (OB3b), and
displaying the image (VIMG1) having image points which correspond to output light beams of the output light (OUT1), the method further comprising:
optically isolating the first expander element (DOE2*a*) and the second expander element (DOE2*b*) by the one or more optically isolating elements (ISO1), thereby preventing direct optical coupling between the first expander element (DOE2*a*) and the second expander element (DOE2*b*), wherein the one or more optically isolating elements (ISO1) are a black absorbing material.

\* \* \* \* \*